(12) United States Patent
Scurati et al.

(10) Patent No.: US 10,128,057 B2
(45) Date of Patent: Nov. 13, 2018

(54) SUPERCAPACITOR WITH MOVABLE SEPARATOR AND METHOD OF OPERATING A SUPERCAPACITOR

(71) Applicant: STMICROELECTRONICS S.R.L., Agrate Brianza (IT)

(72) Inventors: Mario Giovanni Scurati, Milan (IT); Marco Morelli, Bareggio (IT); Fulvio Vittorio Fontana, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 134 days.

(21) Appl. No.: 15/164,702

(22) Filed: May 25, 2016

(65) Prior Publication Data

US 2017/0125173 A1 May 4, 2017

(30) Foreign Application Priority Data

Oct. 28, 2015 (IT) .......................... 102015000066515
Mar. 25, 2016 (IT) .......................... 102016000031722

(51) Int. Cl.
| | |
|---|---|
| *H01G 9/00* | (2006.01) |
| *H01G 9/02* | (2006.01) |
| *H01G 11/14* | (2013.01) |
| *H01G 11/52* | (2013.01) |
| *H01G 11/22* | (2013.01) |
| *H01G 11/78* | (2013.01) |

(Continued)

(52) U.S. Cl.
CPC .............. *H01G 11/18* (2013.01); *H01G 11/22* (2013.01); *H01G 11/52* (2013.01); *H01G 11/78* (2013.01)

(58) Field of Classification Search
CPC ........ H01G 11/14; H01G 11/52; H01G 11/22; H01G 11/72; H01G 9/02; H01G 9/155; H01G 9/145; H01G 11/18

USPC .......................................... 361/502, 503, 512
See application file for complete search history.

(56) References Cited

U.S. PATENT DOCUMENTS

| | | | |
|---|---|---|---|
| 5,508,542 | A | 4/1996 | Geiss et al. |
| 8,097,222 | B2 | 1/2012 | Scurati |
| 8,778,800 | B1 | 7/2014 | Chang et al. |

(Continued)

FOREIGN PATENT DOCUMENTS

| | | |
|---|---|---|
| CN | 101 923 956 A | 12/2010 |
| DE | 630 215 C | 5/1936 |

(Continued)

OTHER PUBLICATIONS

Kongats, A., "Supercapacitors for Micro-Hybrid Automotive Applications," CAP-XX Ltd., Apr. 18, 2013, 24 pgs.

(Continued)

*Primary Examiner* — Eric Thomas
*Assistant Examiner* — Arun Ramaswamy
(74) *Attorney, Agent, or Firm* — Seed IP Law Group LLP

(57) ABSTRACT

A supercapacitor including: a shell; a chamber in the shell; a first electrode and a second electrode on respective walls of the chamber; and a separator arranged between the first electrode and the second electrode through the chamber. The separator includes a first perforated membrane and a second perforated membrane, which is movable with respect to the first membrane between a first position, in which the first membrane and the second membrane are separate and a second position, in which the first membrane and the second membrane are in contact and coupled for rendering the separator impermeable.

20 Claims, 15 Drawing Sheets

(51) Int. Cl.
*H01G 11/18* (2013.01)
*H01G 9/145* (2006.01)

(56) References Cited

U.S. PATENT DOCUMENTS

| | | |
|---|---|---|
| 8,942,394 B2 | 1/2015 | Conti et al. |
| 2005/0208383 A1 | 9/2005 | Totsuka et al. |
| 2008/0145750 A1 | 6/2008 | Yang |
| 2008/0151472 A1 | 6/2008 | Maletin et al. |
| 2011/0027621 A1 | 2/2011 | Deane et al. |
| 2013/0224632 A1 | 8/2013 | Roumi |
| 2014/0183694 A1 | 7/2014 | Gardner et al. |
| 2014/0233152 A1 | 8/2014 | Gardner et al. |
| 2015/0171398 A1 | 6/2015 | Roumi |

FOREIGN PATENT DOCUMENTS

| | | |
|---|---|---|
| JP | 2006-156124 A | 6/2006 |
| JP | 2010-161097 A | 7/2010 |

OTHER PUBLICATIONS

Simon, P. et al., "Materials for electrochemical capacitors," Nature Materials (7):845-854, Nov. 2008.

Cap-XX HW209 Supercapacitor Datasheet Revision 3.1, 11 pgs., Feb. 2009.

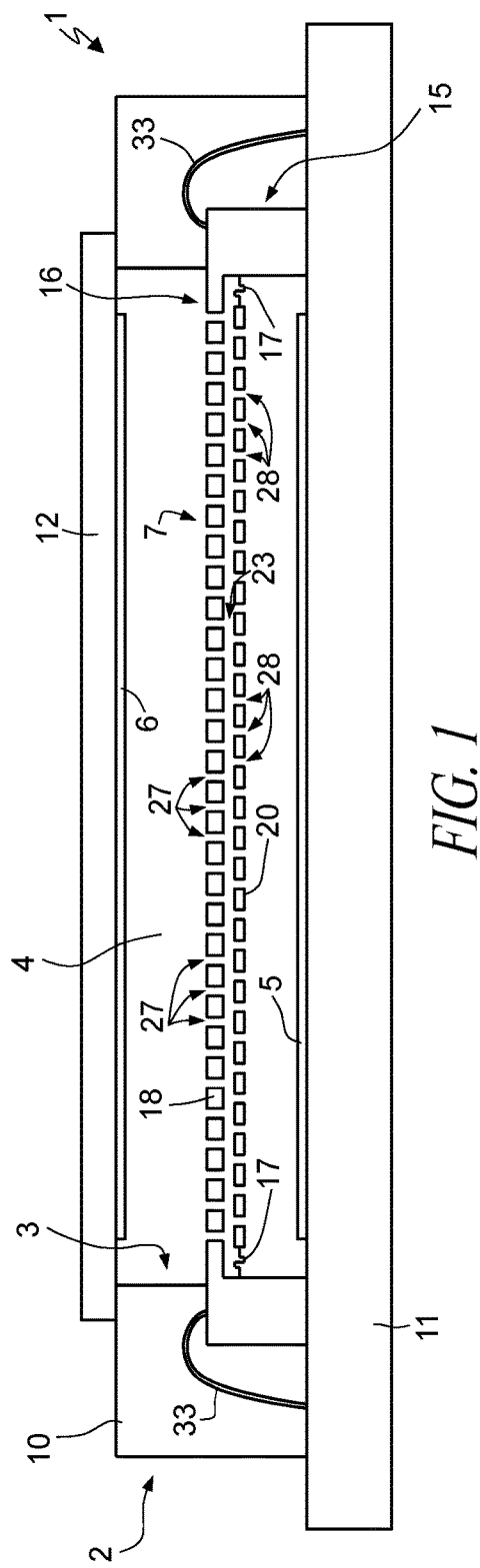
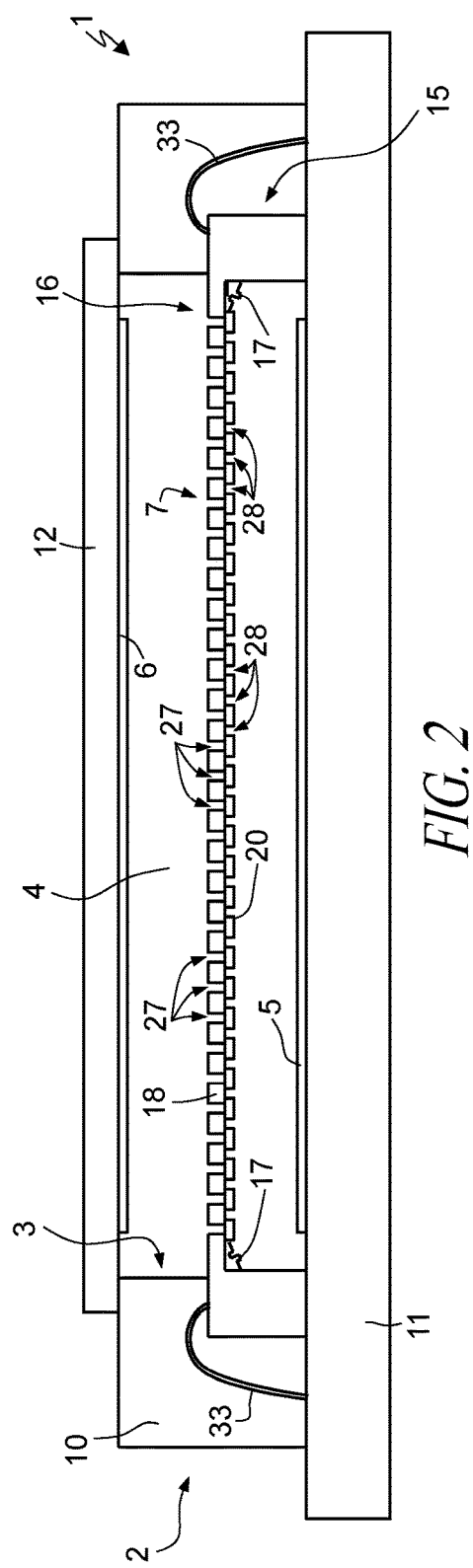

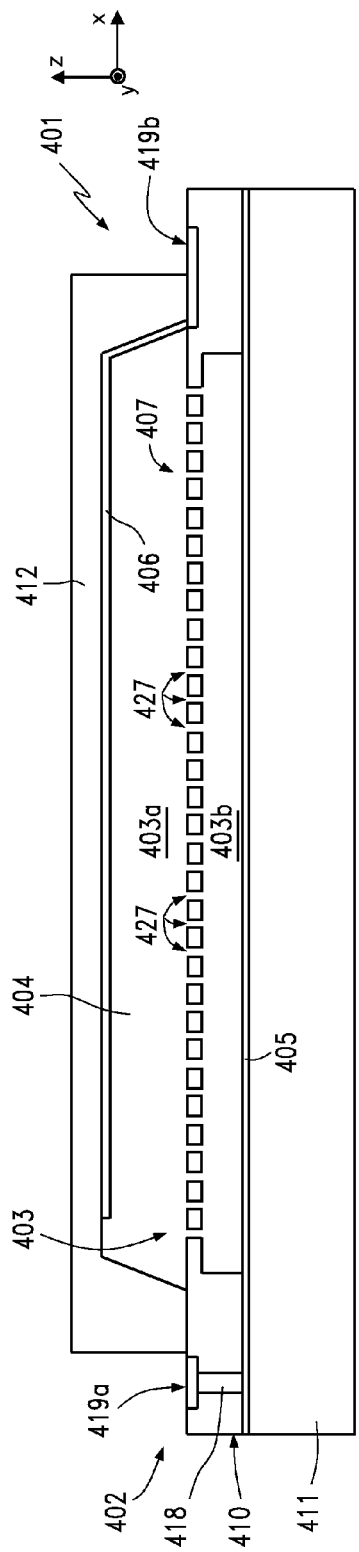
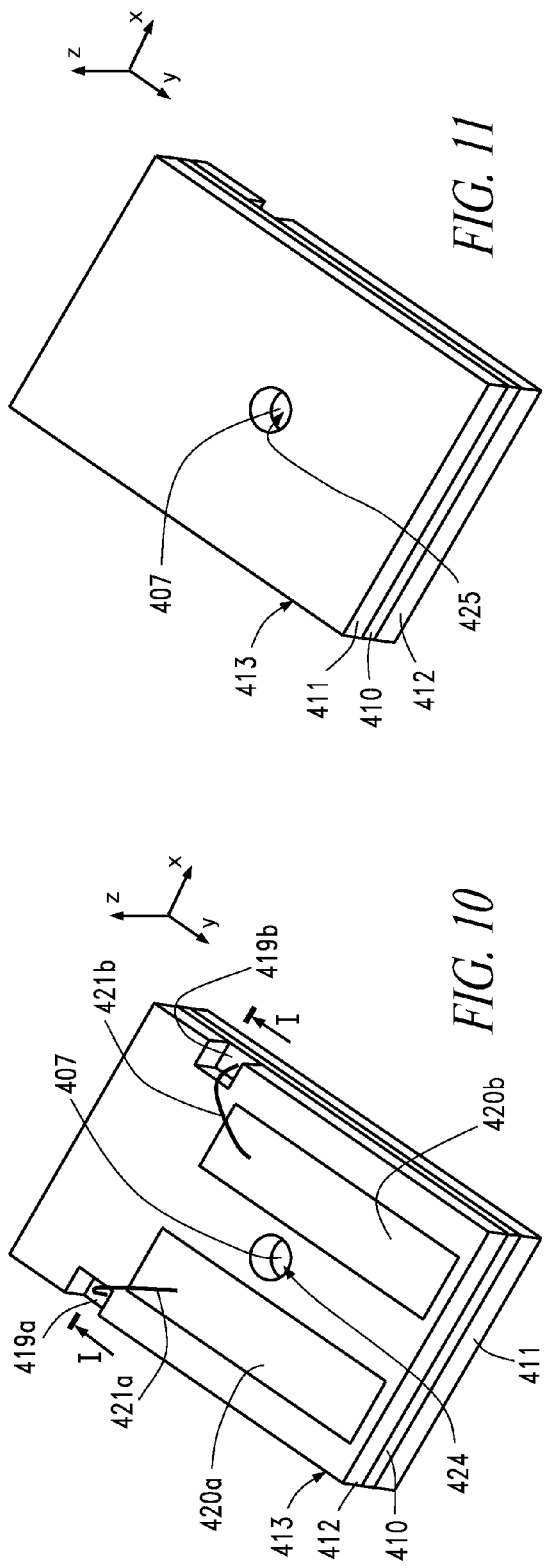
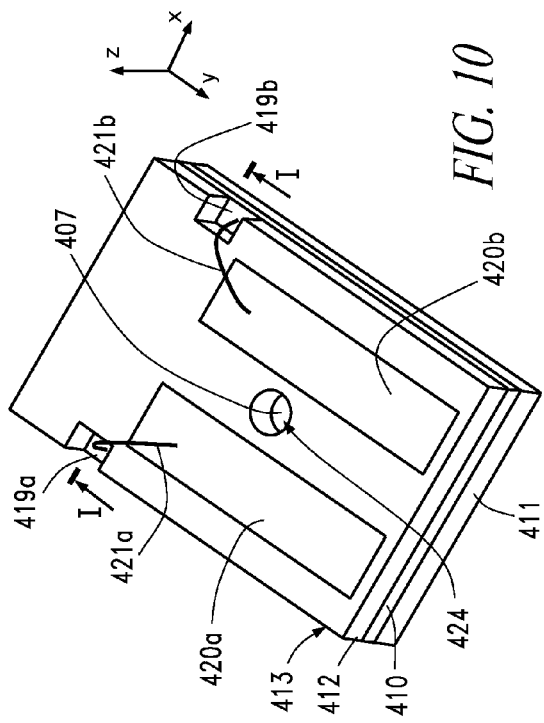
FIG. 9
FIG. 10
FIG. 11

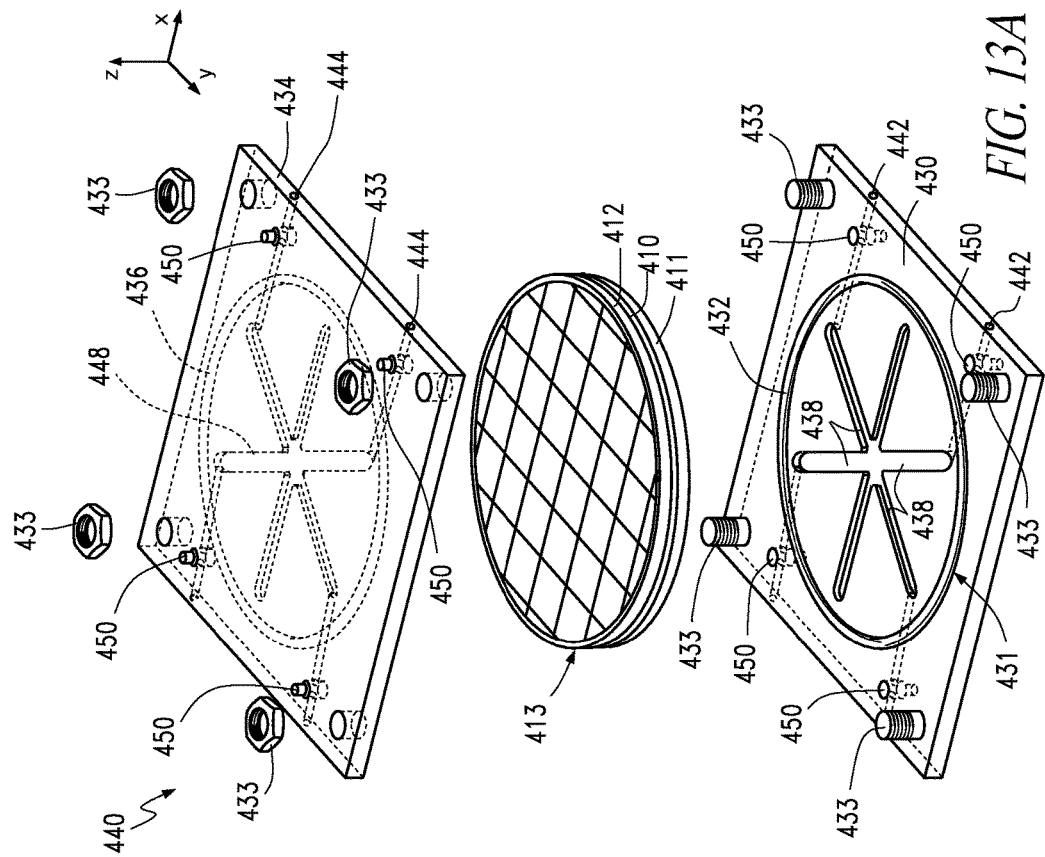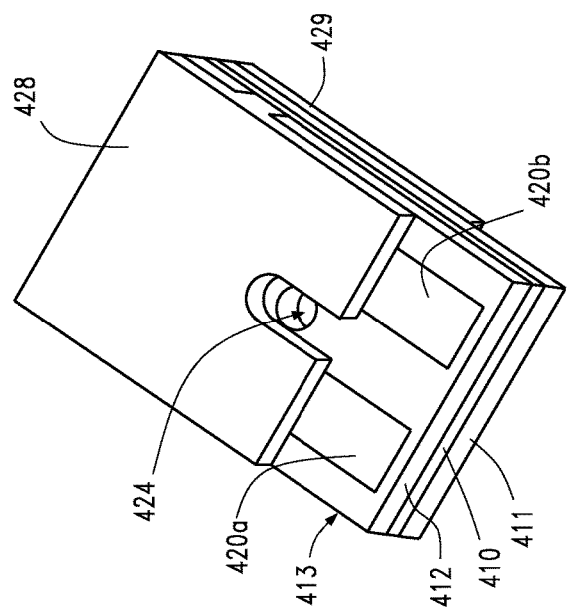

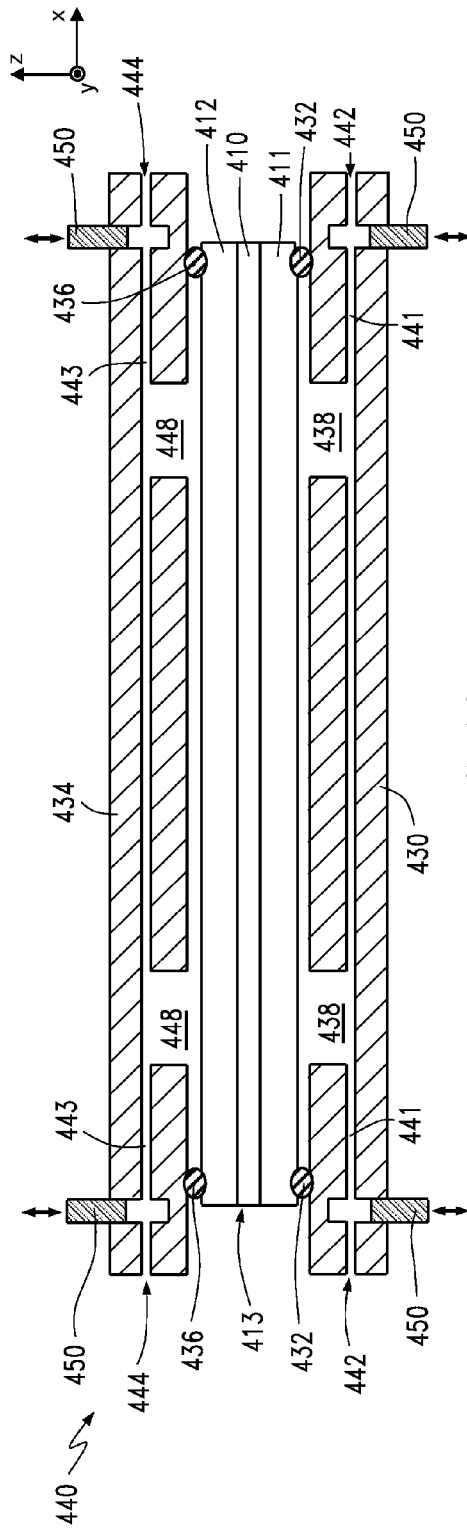
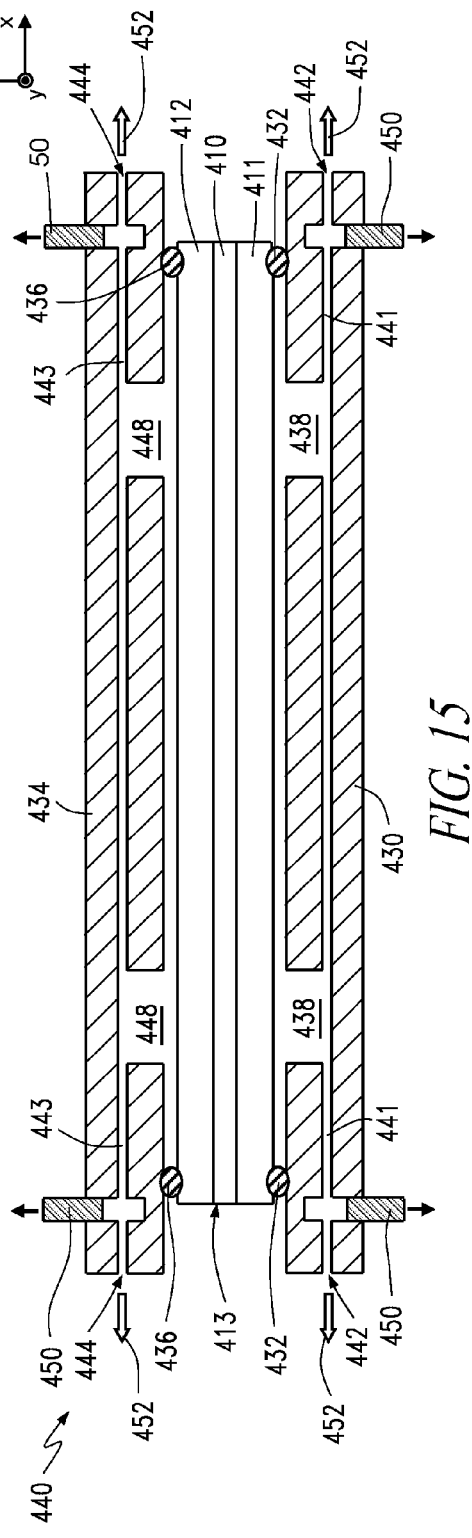

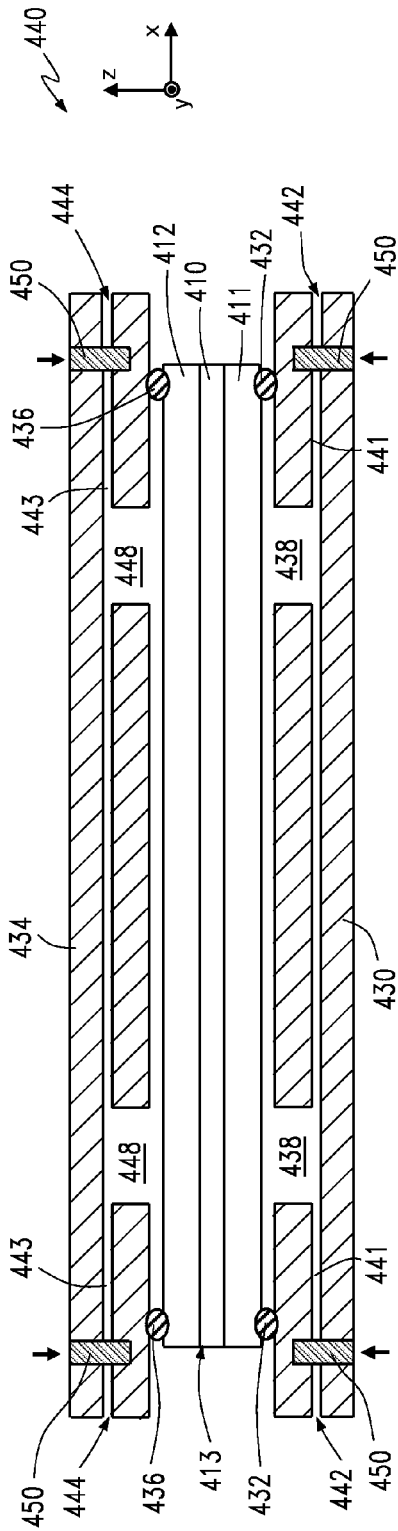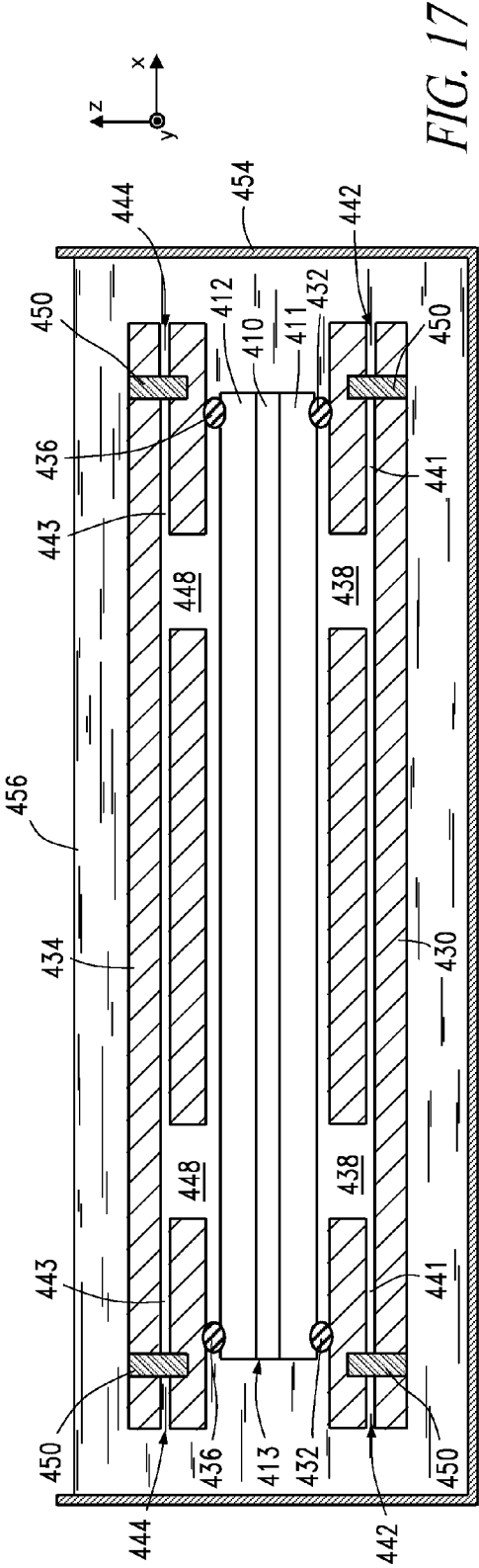

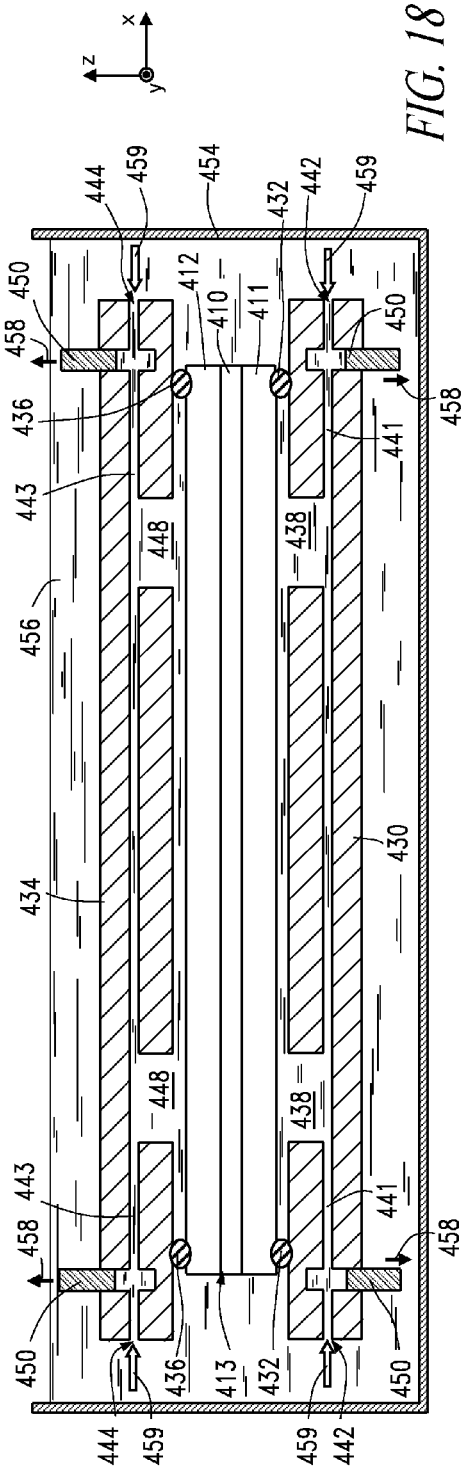
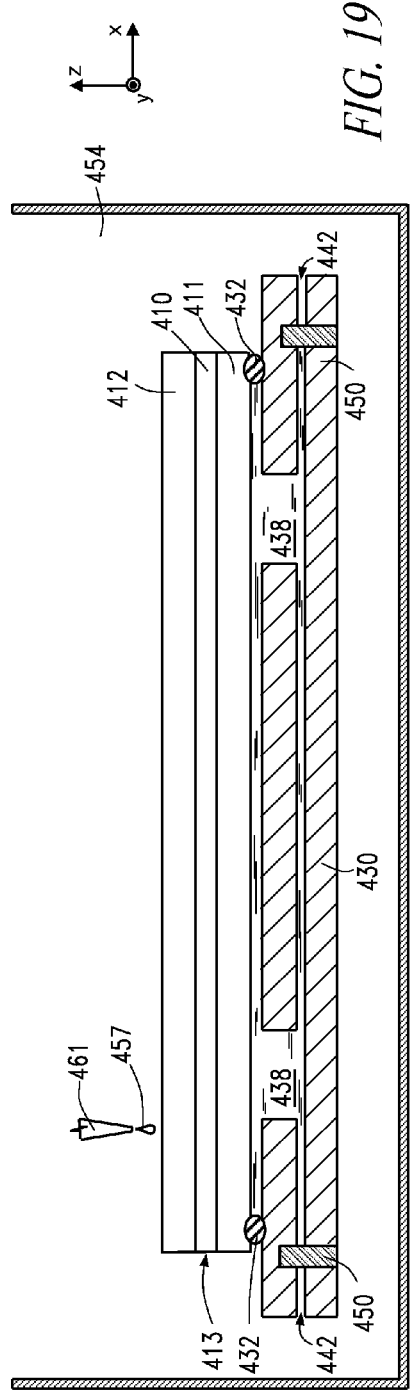

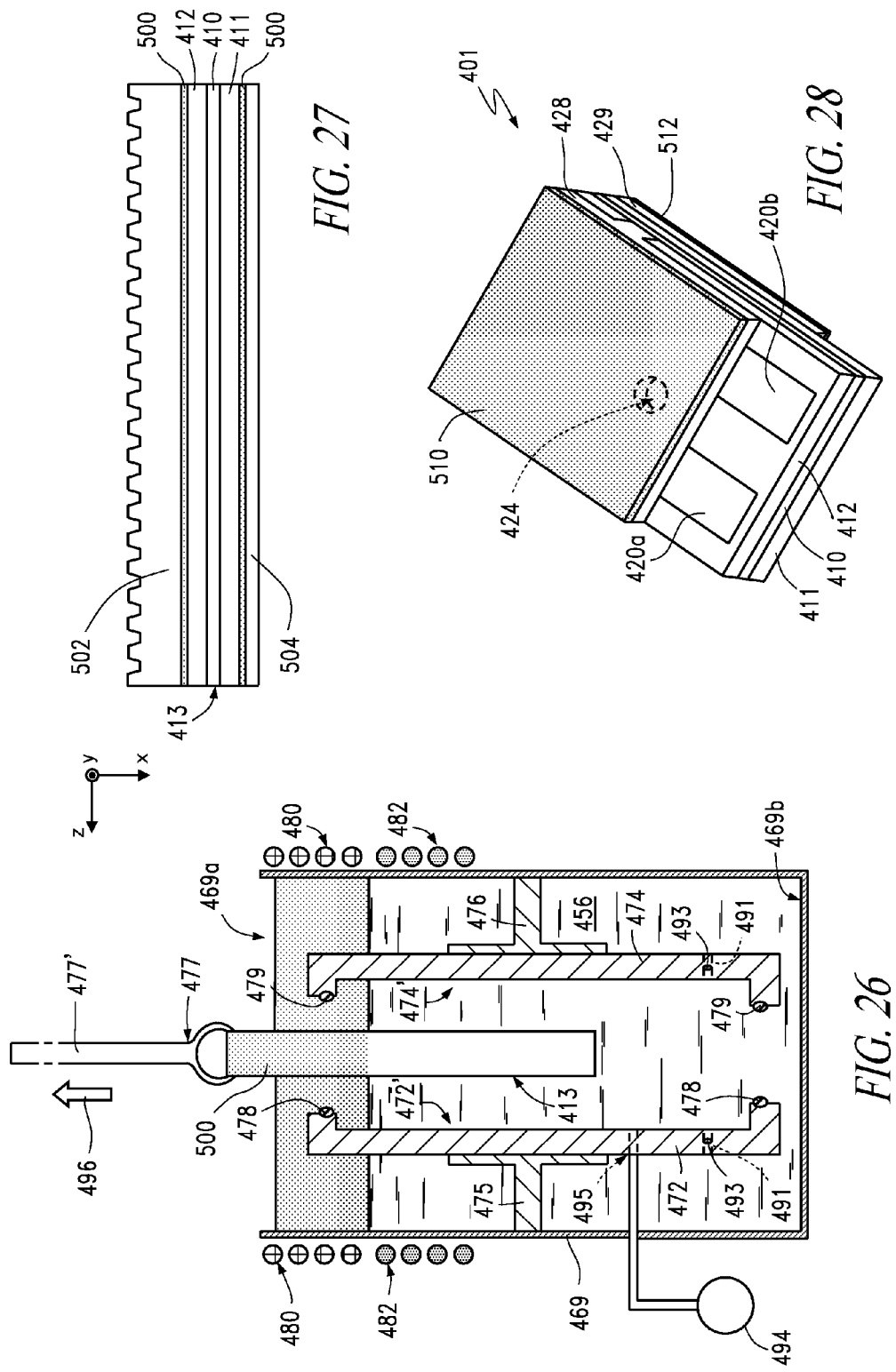

SUPERCAPACITOR WITH MOVABLE SEPARATOR AND METHOD OF OPERATING A SUPERCAPACITOR

BACKGROUND

Technical Field

The present disclosure relates to a supercapacitor with movable separator and to a method of operating a supercapacitor. The present disclosure also relates to a method of manufacturing a package for a supercapacitor, and a supercapacitor thus obtained.

Description of the Related Art

As is known, supercapacitors are devices for energy storage and are encountering an ever-increasing use in different sectors on account of their peculiar features. Supercapacitors are distinguished, in fact, both from conventional capacitors, owing to the higher density of energy stored (J/kg) and from batteries, owing to the higher power density (W/kg). As compared to batteries, in other words, supercapacitors are able to store and supply the energy stored in times that are much shorter, even though the energy totally available is lower.

The fields of use of supercapacitors are extremely varied, both for low-voltage applications and for power applications.

By way of example, at low voltage, supercapacitors are frequently used: as backup source for memory functions in a wide range of devices, such as cellphones, tablets and portable computers; in applications in pulse-width modulation in portable devices that use electromechanical actuators (such as zoom systems and systems for automatic focusing in photographic cameras and video cameras, or devices for parking the read/write heads in many mass-memory devices), in order to prolong the service life of the main batteries; and for storing energy converted by photovoltaic panels. As regards power applications, supercapacitors are advantageously used for example in systems for harvesting the kinetic energy of vehicles by storing energy during braking and returning it during acceleration. Supercapacitors are also used in uninterruptible power supplies (UPSs) for short-period interventions in which a fast action is desired. Combination with supercapacitors also has beneficial effects on the life of the batteries, which thus basically intervene during prolonged interruptions and are generally called on to supply lower peak currents. For this reason, further, smaller batteries may be used.

Supercapacitors generally comprise two electrodes, for example of aluminum or ruthenium oxide, an electrolyte and a separator. The electrodes are arranged at ends of a chamber filled by the electrolyte. The separator, which is defined by a porous diaphragm permeable to the passage of ions, is arranged between the electrodes and prevents short circuits between the electrodes themselves.

The separator is an important element of supercapacitors, because it concurs in determining the equivalent series resistance (ESR) and the power that may be supplied by the supercapacitor, which is the greater the lower the equivalent series resistance. With current manufacturing techniques, the thickness that may be reached for the separators is in the region of 20 µm, a size that fixes the lower limit of the equivalent series resistance and consequently the maximum power that may be supplied.

Another important element of supercapacitors, which is also affected by the separator, is the discharge current. When the power source that determines charging of the supercapacitor is removed, a discharge current is in fact triggered because the porous separator enables a process of reverse migration of the ions that tends to cause the voltage across the electrodes to vanish. The discharge currents are in general significant and determine discharge in relatively short times or require periodic recharging procedures.

Current techniques for filling the chamber with electrolyte are not optimal. In particular, known techniques, which envisage opening of through holes for fluidic access to the chamber (used for introducing the electrolyte), and subsequent closing of said holes, are carried out according to known steps of micromachining of semiconductor materials (e.g., photolithography and etching), with the consequence that the inner chamber may be contaminated by particles deriving from the micromachining process.

Further, the step of closing of the holes for fluidic access to the chamber is, according to the known art, inconvenient. In the first place, it may be noted that classic techniques of "moulding" at high temperature (higher than 150° C.) may not be applied in the presence of electrolytes having a relatively low boiling point (around 100° C.).

Further, it may be noted that it is further inconvenient to dispense sealant material in the case where the holes for access to the inner chamber are made in the area of both of the electrodes (i.e., on both sides of the inner chamber). In fact, in this case, to prevent exit of the electrolyte from one of the holes, it would be necessary to dispense the sealant material simultaneously in both of the holes. This would require the use of systems specifically provided for the purpose, with a further economic burden.

Finally, there are evident the difficulties in handling the wafer in the step that follows introduction of the electrolyte into the inner chamber and that precedes closing of the holes in order to minimize undesirable leakage of electrolyte.

BRIEF SUMMARY

At least some embodiments of the present disclosure provide a supercapacitor and a method of operating a supercapacitor that will enable the limitations described to be overcome or at least attenuated.

According to at least some embodiments of the present disclosure, a supercapacitor includes a shell, a chamber in the shell, a first electrode and a second electrode on respective walls of the chamber, and a separator arranged between the first electrode and the second electrode across the chamber. The separator includes a perforated first membrane and a perforated second membrane which is movable with respect to the first membrane between a first position, in which the first membrane and the second membrane are separated from each other and a second position, in which the first membrane and the second membrane are in contact with each other and coupled so as to render the separator impermeable.

According to at least some embodiments of the present disclosure a method of operating a supercapacitor includes enabling a current supply by setting the second membrane in the first position; and disabling the current supply by setting the second membrane in the second position.

At least some embodiments of the present disclosure provide a process of manufacturing a package for a supercapacitor, and a supercapacitor, that will enable the limitations described above to be overcome or at least attenuated.

At least some embodiments of the present disclosure provide a process of manufacturing a supercapacitor package, the process including:

providing a supercapacitor that includes a shell; a chamber defined inside the shell, fluidically accessible by a first through hole and a second through hole extending through the shell on diametrically opposite sides thereof; a first electrode and a second electrode on respective inner walls of the chamber; and a separator extending in the chamber between the first electrode and the second electrode and including at least one perforated membrane;

generating, inside the chamber of the supercapacitor, an operating pressure having a value lower than the environmental pressure external to the chamber;

immersing the supercapacitor in an electrolytic solution and enabling a self-sustained flow of the electrolytic solution towards the inside of the chamber through the first and second through holes; and hermetically sealing the first and second through holes, interrupting fluidic connection between the chamber and the environment external to the supercapacitor.

In at least some embodiments of the present disclosure, hermetically sealing the first and second through holes comprises dispensing a sealant material having a temperature of transition from solid phase to liquid phase equal to, or lower than, the boiling point of the electrolytic solution.

In at least some embodiments of the present disclosure, the supercapacitor has, at an outer surface of the shell: the first and second through holes; a first contact pad and a second contact pad; and conductive wires configured to form part of an electrical connection between the first contact pad and the first electrode, and between the second contact pad and the second electrode.

In at least some embodiments of the present disclosure, the process further includes carrying out a moulding of plastic material on the metal wires and at least partially around the first and second through holes to form a first protective layer on the metal wires and at least partially around the first through hole, and a second protective layer at least partially around the second through hole.

In at least some embodiments of the present disclosure, generating the operating pressure comprises generating a pressure lower than 1 mbar.

In at least some embodiments of the present disclosure, generating the operating pressure is carried out prior to hermetically sealing the first and second through holes and includes:

sandwiching the supercapacitor between a first supporting base and a second supporting base, which define inside a hermetic housing for the supercapacitor, the first and second supporting bases being provided with: a respective first buried channel and second buried channel, which are configured to fluidically connect the hermetic housing with the environment external to the first and second supporting bases; and a respective first valve and second valve operatively coupled to the first and second buried channels, respectively, and configured to activate during a first operating condition, and inhibit during a second operating condition, fluidic connection between the hermetic housing and the external environment;

driving the first and second valves into the first operating condition;

operatively coupling the hermetic housing with a vacuum pump through said first buried channel, generating said operating pressure in the hermetic housing and, via the first and second through holes, in the chamber; and driving the first and second valves into the second operating condition.

In at least some embodiments of the present disclosure, enabling the self-sustained flow comprises keeping the supercapacitor immersed in the electrolytic solution up to complete balancing between the pressure inside the chamber and the pressure of the electrolytic solution.

In at least some embodiments of the present disclosure, enabling the self-sustained flow of the electrolytic solution towards the inside of the chamber comprises, after immersion of the supercapacitor in the electrolytic solution, the steps of:

driving the first and second valves into the first operating condition; and keeping the first and second valves in the first operating condition up to complete balancing between the pressure inside the chamber and the pressure of the electrolytic solution.

In at least some embodiments of the present disclosure, the providing, generating, immersing, and sealing steps are carried out at a wafer level.

In at least some embodiments of the present disclosure, immersing the supercapacitor in the electrolytic solution comprises:

inserting the supercapacitor in a tank; and pouring the electrolytic solution into the tank, and hermetically sealing the first and second through holes comprises, after the immersing:

pouring a paraffin wax into the tank, the paraffin wax having a molecular weight lower than that of the electrolytic solution and forming a buoyant layer on the electrolytic solution;

taking the supercapacitor out of the tank and passing it through the buoyant layer of paraffin wax, thereby depositing a film of wax on the supercapacitor, thus clogging the first and second through holes; and selectively removing the film of wax from the supercapacitor except for regions thereof corresponding to the first and second through holes.

In at least some embodiments of the present disclosure, the process also includes:

heating selective portions of the tank that extend at a height greater than the height reached by the electrolytic solution to maintain the paraffin wax in the liquid state;

and, simultaneously cooling said electrolytic solution to keep it at a temperature lower than its boiling point.

In at least some embodiments of the present disclosure, removing selectively the film of wax comprises:

providing a first cooling plate in direct contact with portions of the film of wax that extend over the first protective layer;

providing a second cooling plate in direct contact with portions of the film of wax that extend over the second protective layer;

keeping said first and second cooling plates at a temperature lower than the melting point of the film of wax; and supplying, in the direction of said supercapacitor, a flow of a solvent having a temperature such as to melt the film of wax in the regions that are not in contact with the first and second cooling plates and a chemical composition such as to remove the molten wax.

At least some embodiments of the present disclosure provide a supercapacitor that includes:

a shell;

a chamber defined inside the shell fluidically connected to a first through hole and a second through hole, which extend through the shell on diametrically opposite sides of the shell;

a first electrode and a second electrode on respective inner walls of the chamber;

a separator extending in the chamber between the first electrode and the second electrode and including at least one perforated membrane; and a first plug and a second plug, which extend in the first and second through holes, which are configured to hermetically seal said first and second through holes and are of a material having a temperature of transition from solid phase to liquid phase that is equal to or lower than the boiling point of the electrolytic solution.

In at least some embodiments of the present disclosure, the supercapacitor also includes:

a first contact pad and a second contact pad on the shell;

conductive wires configured to form part of an electrical connection between the first contact pad and the first electrode, and between the second contact pad and the second electrode;

a first protective layer and a second protective layer, which extend alongside the first and second through holes and englobe the conductive wires; and a first clogging layer and a second clogging layer, which extend without solution of continuity over the first and second protective layers and in the first and second through holes, to form said first and second plugs.

In at least some embodiments of the present disclosure, the first and second plugs are of a material chosen in the group comprising: a urethane resin, an acrylic resin, an epoxy resin, a wax, a paraffin wax, and a thermoplastic polymer.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein:

FIG. 1 is a cross-sectional view through a supercapacitor according to one embodiment of the present disclosure, in a first operating configuration;

FIG. 2 shows the supercapacitor of FIG. 1 in a second operating configuration;

FIG. 9 is a view in lateral section of a supercapacitor;

FIGS. 10 and 11 are perspective views of the supercapacitor of FIG. 9;

FIG. 12 is a perspective view of the supercapacitor of FIG. 9 in a subsequent manufacturing step;

FIGS. 13A-21 show steps of filling of the supercapacitor of FIGS. 9-12 with an electrolytic solution and of manufacture of a package of said supercapacitor, according to one embodiment of the present disclosure; and FIGS. 22-28 show steps of filling of the supercapacitor of FIGS. 9-12 with an electrolytic solution and of manufacture of a package of said supercapacitor, according to a further embodiment of the present disclosure.

DETAILED DESCRIPTION

Figure 3:
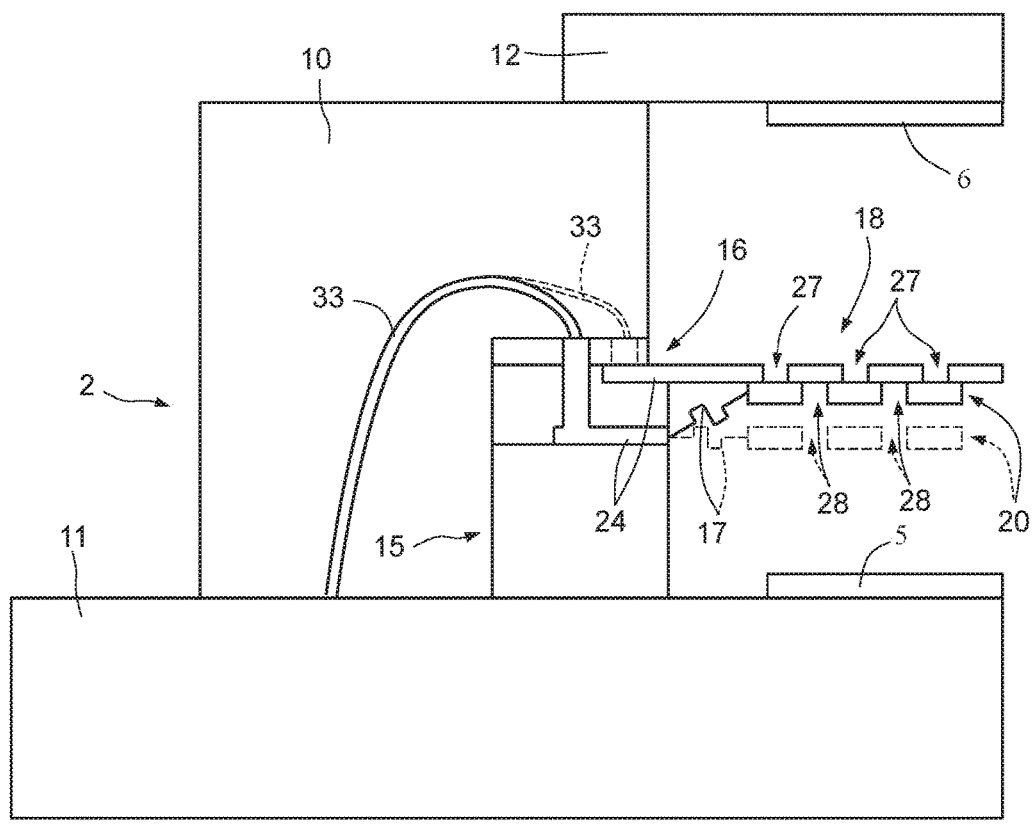
FIG. 3 shows an enlarged detail of the supercapacitor of FIG. 1.

With reference to FIGS. 1-3, a supercapacitor according to one embodiment of the present disclosure is designated by the number 1 and comprises a shell 2, a chamber 3, which is defined in the shell 2 and contains an electrolyte 4, a first electrode 5, a second electrode 6 and a separator 7.

In one embodiment, the shell 2 comprises a frame structure 10, arranged on a base 11 and closed by a lid 12 on a side opposite to the base 11. The frame structure 10, the base 11 and the lid 12 define walls of the chamber 3.

The frame structure 10, made, for example, of polymeric material, has a through cavity and defines the chamber 3 laterally. In one embodiment, the frame structure and the base may be provided by a premolded package structure.

The chamber 3 is closed and sealed on opposite sides by the base 11 and by the lid 12 and is filled with the electrolyte 4. The first electrode 5 and the second electrode 6 are arranged on the base 11 and on the lid 12, respectively and both face the inside of the chamber 3, in contact with the electrolyte 4. In one embodiment, both the base 11 and the lid 12 may be defined by ceramic substrates or of a composite material formed by a fiber-glass fabric in a matrix of epoxy resin, for example FR4. The electrodes 5, 6 may be provided according to any known technique aimed at increasing the contact surface per unit area between the electrodes 5, 6 and the electrolyte 4. For example, the electrodes 5, 6 may be obtained using graphene, nanotubes, or porous silicon.

The frame structure 10 incorporates a semiconductor substrate 15, which is fixed to the base 11 and supports the separator 7 inside the chamber 3. In greater detail, a portion of the semiconductor substrate 15 defines a frame structure 16 that is internal to the frame structure 10, which lies on the outside and extends around a portion of the chamber 3. The separator 7 is connected to the frame structure 16 and extends through the chamber 3 substantially parallel to the base 11 and to the lid 12. The chamber 3 is thus divided into two parts, one defined between the separator 7 and the base 11, where the first electrode 5 is located and one between the separator 7 and the lid 12, where the second electrode 6 is located. Both of the parts of the chamber 3 are filled with the electrolyte 4.

The separator 7 comprises a first membrane 18 and a second membrane 20 parallel to one another.

The first membrane 18 is a rigid perforated membrane and is fixed to the frame structure 16. In one embodiment, the first membrane 18 is made of semiconductor material and may be coated with a protective layer (not shown) to prevent direct contact with the electrolyte, which is potentially harmful. The first membrane 18 may have a thickness much smaller than 20 µm, for example smaller than 3 µm.

Also the second membrane 20 is made of semiconductor material, is perforated and, like the first membrane 18, may be coated with a protective layer (not shown) and have a thickness much smaller than 20 µm, for example 3 µm. Not necessarily do the first membrane 18 and the second membrane 20 have the same thickness. Further, the second membrane 20 is movable with respect to the frame structure 16 and to the first membrane 18, to which it is parallel. In one embodiment, the second membrane 20 is connected to the frame structure 16 by elastic connection elements 17. In a different embodiment, the second membrane 20 may be elastically deformable and be connected to the frame structure 16 along its own perimeter. In particular, the second membrane 20 is movable between a first position, in which the first membrane 18 and the second membrane 20 are separated by a gap 23 (FIGS. 1 and 3) and a second position, in which the first membrane 18 and the second membrane 20 are in contact with one another. In one embodiment, in the absence of external forces, the second membrane 20 is located in the first position, which is a resting position.

The first membrane 18 and the second membrane 20 are capacitively coupled and are provided with respective electrical connection lines 24 (FIG. 3) for coupling with a bias-voltage source. The electrical connection lines 24 and the capacitive coupling between the membranes 18, 20 define in practice an electrostatic actuator. By biasing the membranes 18, 20 through the electrical connection lines 24 it is possible to apply a repulsive or attractive electrostatic force and consequently determine the position of the second membrane 20 with respect to the first membrane 18 (in particular, to bring the second membrane 20 into the second position, in contact with the first membrane 18).

As already mentioned, the first membrane 18 and the second membrane 20 are perforated. More precisely, the first membrane 18 has holes defined by first through channels 27, which extend in length throughout the thickness of the first membrane 18 and have a maximum transverse dimension for example of 2 μm. The first channels 27 are evenly distributed over the entire first membrane 18, for example with a full/void ratio of approximately 60/40. Likewise, the second membrane 20 has holes defined by second through channels 28, which extend in length throughout the thickness of the second membrane 20 and have a maximum transverse dimension approximately equal to the maximum transverse dimension of the first channels 27. Also the second channels 27 are evenly distributed over the entire second membrane 20, with density equal to the density of the first channels 27. The first channels 27 and the second channels 28 are, however, misaligned so that, when the second membrane 20 is in the second position, in contact with the first membrane 18, the first channels 27 are obstructed by the second membrane 20 and, conversely, the second channels 28 are obstructed by the first membrane 18. Consequently, when the second membrane 20 is in the second position in contact with the first membrane 18, the separator 7 is substantially impermeable and prevents passage of ions between the first electrode 5 and the second electrode 6. When, instead, the second membrane 20 is in the first position, at a distance from the first membrane 18, the two parts of the chamber 3 are fluidly coupled through the first channels 27, the gap 23 and the second channels 28 and the passage of ions between the first electrode 5 and the second electrode 6 is enabled. Consequently, in practice, the supercapacitor 1 may be alternatively enabled and disabled with an electrical command that sets the second membrane 20, respectively, in the first position (or in any case at a distance from the first membrane 18) and in the second position.

Figure 4:
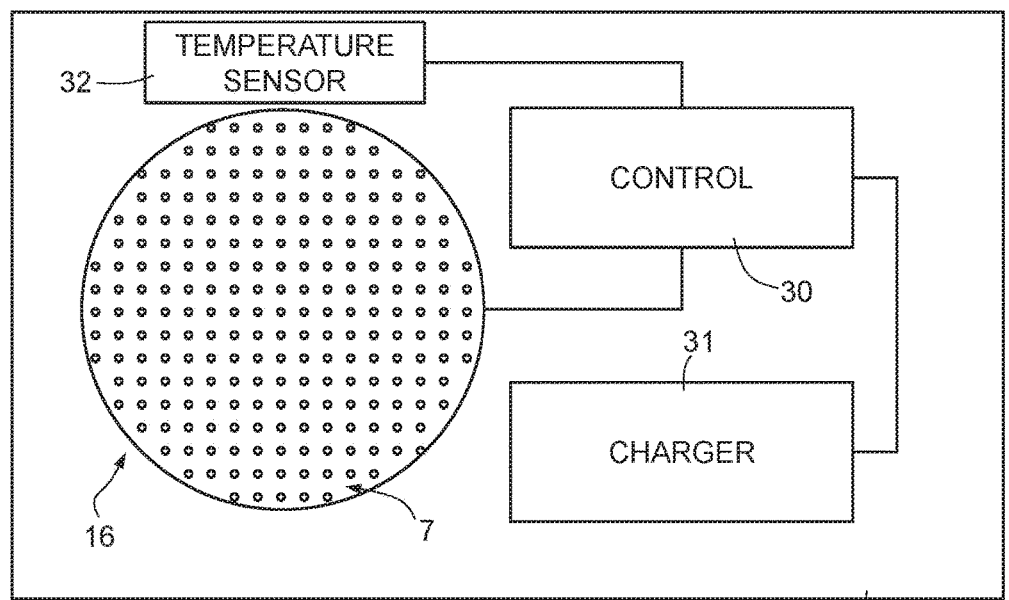
FIG. 4 is a simplified block diagram of the supercapacitor of FIG. 1.

In one embodiment (FIG. 4), the supercapacitor 1 comprises a driving device 30 and a charger device 31, integrated in the semiconductor substrate 15. The supercapacitor 1 is further provided with a temperature sensor 32 thermally coupled to the inside of the chamber 3 and configured to supply a temperature signal ST indicating an internal temperature, for example the temperature of the electrolyte 4.

The driving device 30 is configured to supply a control signal SC to the separator 7 and, in practice, defines a bias source for the electrostatic actuator formed by the membranes 18, 20 and by the electrical connection lines 24. The control signal SC makes it possible to determine the position of the second membrane 20 and thus the state of the supercapacitor 1, whether enabled or disabled. Maintaining the supercapacitor 1 disabled when it is not in use enables the discharge currents to be substantially set to zero, because in this condition the separator 7 is impervious to the passage of ions. The charge stored may thus be preserved much longer as compared to conventional supercapacitors.

In one embodiment, the control signal SC may be generated as a function of the temperature signal ST supplied by the temperature sensor 32. In particular, the control signal SC is generated for disabling the supply of current bringing the second membrane 20 into the second position in contact with the first membrane 18 when the temperature detected inside the chamber 3 exceeds a threshold temperature. In this way, it is possible to implement a protection that interrupts supply of current in the event of overheating, preventing potentially irreversible damage to the supercapacitor 1. In particular, in the event of overheating, the second membrane 20 is brought into the second position in contact with the first membrane 10. Interruption of the current causes heating to cease and prevents breakdown of the device.

The semiconductor substrate 15 and the frame structure 16 of the supercapacitor 1 may be obtained basically using the process described in U.S. Pat. No. 8,942,394 for manufacturing electroacoustic transducers, the U.S. Pat. No. 8,942,394 being incorporated herein by reference in its entirety. As compared to the document referred to, the steps for producing anti-sticking elements between the first membrane 18 and the second membrane 20 are omitted. Further, the second channels 28 may be opened in the second membrane 20 before removing the sacrificial material between the first membrane 18 and the second membrane 20. In this step, a mask may be used having openings corresponding to respective second channels 28.

The semiconductor substrate 15 may then be bonded to the base 11, on which the first electrode 5 has been preliminarily provided. After wire connections 33 have been provided (FIGS. 1-3) for connecting the separator 7, the driving device 30 and the charger device 31 to the base 11, the frame structure 10 is formed. Finally, the lid 12, on which the second electrode 6 has been provided, is applied for closing the chamber 3. The electrolyte 4 may be introduced into the chamber 3 through openings (not shown) in the lid 12 or in the frame structure 10. The openings are then sealed.

Figure 5:
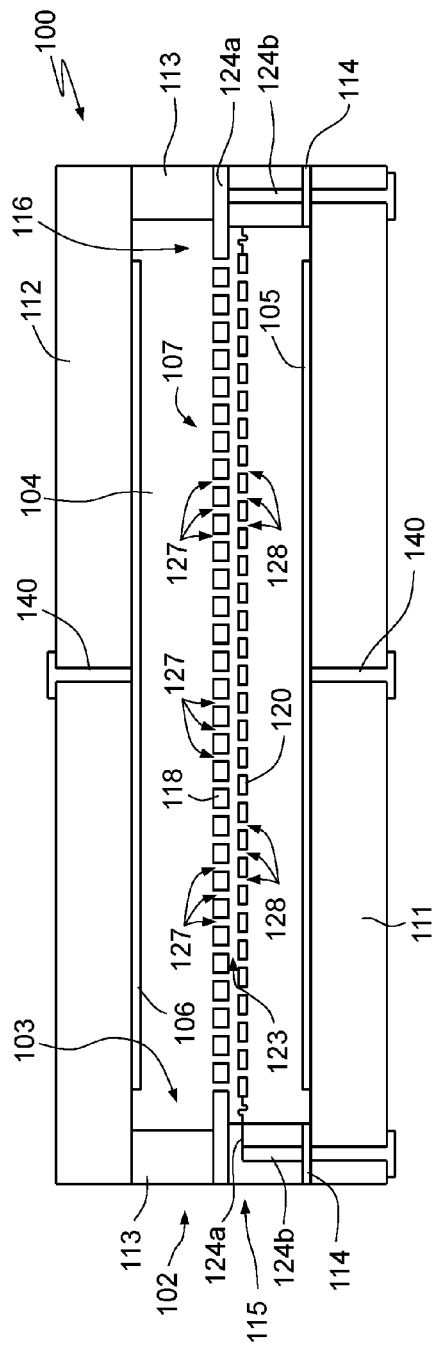
FIG. 5 is a cross-sectional view through a supercapacitor according to a different embodiment of the present disclosure, in a first operating configuration.
Figure 6:
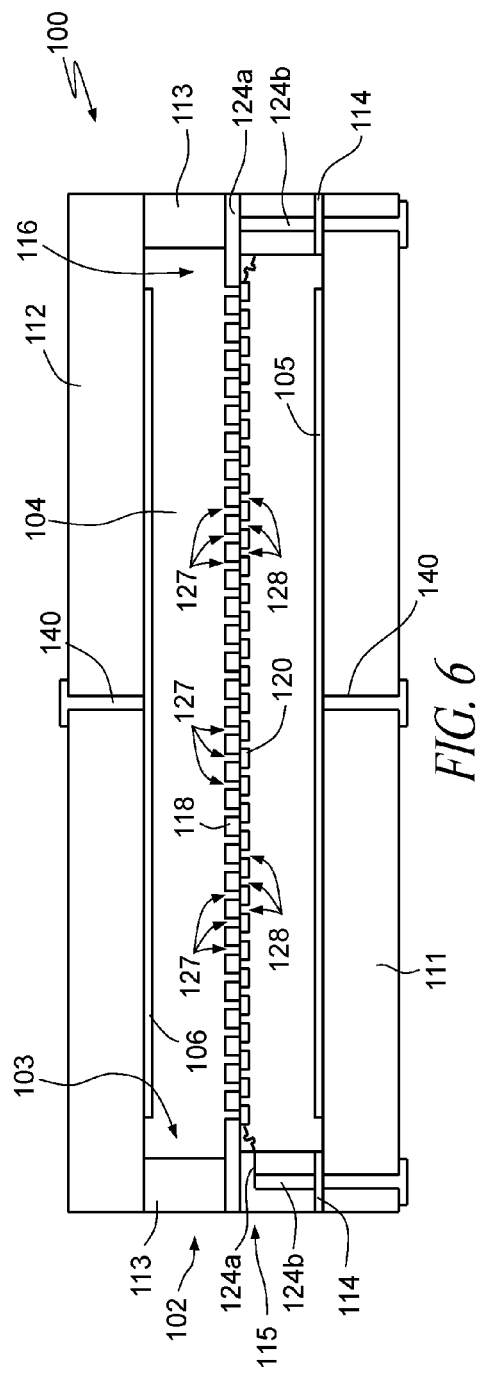
FIG. 6 shows the supercapacitor of FIG. 5 in a second operating configuration.

According to a different embodiment of the disclosure, illustrated in FIGS. 5 and 6, a supercapacitor 100 comprises a shell 102, a chamber 103, defined in the shell 102 and containing an electrolyte 104, a first electrode 105, a second electrode 106 and a separator 107. The shell 102 comprises a supporting semiconductor substrate 115, which defines a frame structure 116 and supports the separator 107, a first closing semiconductor substrate 111 and a second closing semiconductor substrate 112, which define, respectively, a base and a lid of the shell 102.

The supporting semiconductor substrate 115 is arranged between the first closing semiconductor substrate 111 and the second semiconductor substrate 112 and is bonded thereto, respectively, through a spacer structure 113 and a conductive adhesion layer 114. The spacer structure 113 forms a frame that delimits a portion of the chamber 103 around the second electrode 106 and may be made of a polymeric material, for example PDMA (polydimethyl siloxane), or semiconductor material. The adhesion layer 114 is also shaped like a frame and extends around the first electrode 105. Alternatively, the adhesion layer 114 may be replaced by a further frame-like spacer structure of PDMA or some other polymeric or semiconductor material. The shell 102 may be obtained by bonding the supporting semiconductor substrate 115, the first closing semiconductor substrate 111 and the second closing semiconductor substrate 112 using a wafer-to-wafer bonding technique.

The first electrode 105 and the second electrode 106 are provided, respectively, on the first closing semiconductor substrate 111 and on the second closing semiconductor substrate 112 and face the chamber 103. In one embodiment, the first electrode 105 and the second electrode 106 may be obtained with various techniques proper to semiconductors, for example, porous silicon. Conductive through vias 140 in the first closing semiconductor substrate 111 and in the second closing semiconductor substrate 112 enable electrical connection on the outside of the first electrode 105 and the second electrode 106.

The separator 107 is of the type already described with reference to FIGS. 1-3 and comprises a first membrane 118 and a second membrane 120. The first membrane 118 is perforated and rigid and is fixed to the frame structure 116 through the chamber 103 in a direction parallel to the first electrode 105 and to the second electrode 106. The second membrane 120 is made of semiconductor material, is also perforated and is parallel to the first membrane 118. The second membrane 120 is further movable with respect to the frame structure 116 and to the first membrane 118 between a first position, in which the first membrane 118 and the second membrane 120 are separated by a gap 123 and a second position, in which the first membrane 118 and the second membrane 120 are in contact with one another. The first membrane 118 and the second membrane 120 are capacitively coupled, so that the position of the second membrane 120 with respect to the first membrane 118 may be determined by applying a voltage. Connection lines 124a and through vias 124b enable connection of the first membrane 118 and the second membrane 120 to the first closing semiconductor substrate 111 through the conductive adhesion layer 114.

The first membrane 118 and the second membrane 120 have, respectively, first through channels 127 and second through channels 128, misaligned so that, when the second membrane 112 is in contact with the first membrane 118, the first through channels 127 are occluded by the second membrane 120 and the second channels 128 are occluded by the first membrane 118.

Figure 7:
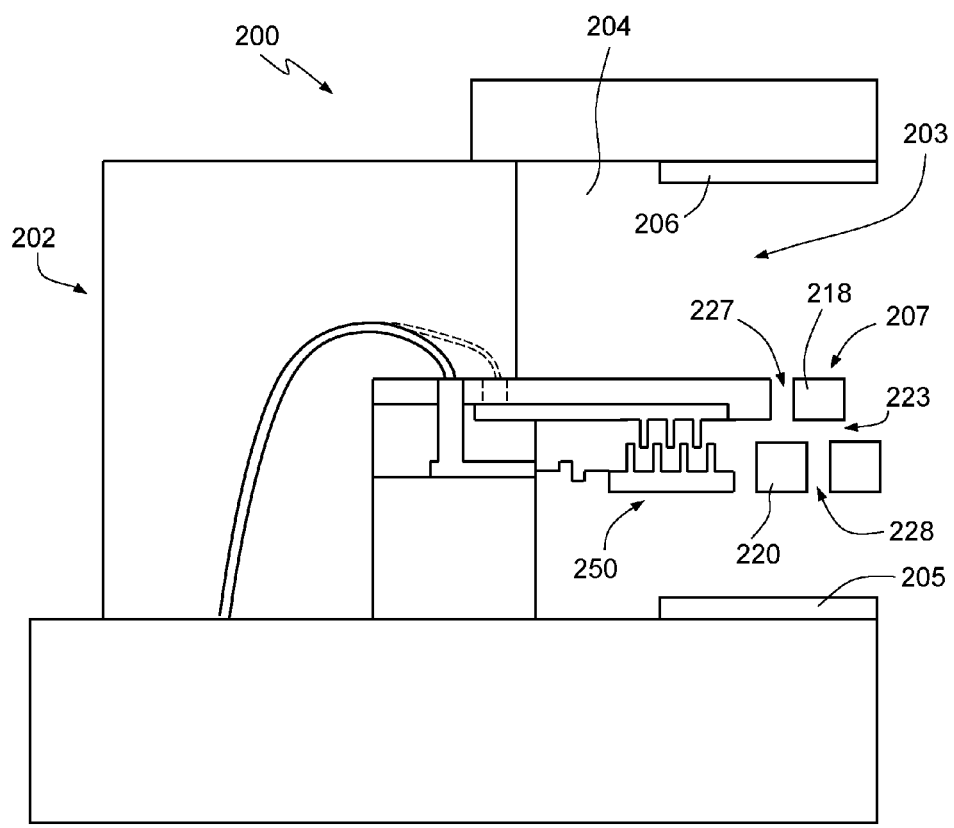
FIG. 7 is a cross-sectional view through a supercapacitor according to a further embodiment of the present disclosure.

In the embodiment of FIG. 7, a supercapacitor 200 comprises a shell 202, a chamber 203 provided in the shell 202 and filled with an electrolyte 204, a first electrode 205, a second electrode 206 and a separator 207 between the first electrode 205 and the second electrode 206. The separator 207 comprises a first membrane 218, which is rigid and fixed to the shell 202 and a second membrane 220, which is movable with respect to the shell 202 and to the first membrane 218 between a first position, in which the first membrane 218 and the second membrane 220 are separated by a gap 223 and a second position, in which the first membrane 218 and the second membrane 220 are in contact with one another. An electrostatic actuator 250, for example of the type with comb-fingered electrodes, has a first portion, connected to the first membrane 218 and a second portion, connected to the second membrane 220 and makes it possible to determine the position of the second membrane 220 with respect to the first membrane 218. In this case, the first membrane 218 and the second membrane 220 may be made of dielectric material. The first membrane 218 and the second membrane 220 are further provided, respectively, with first channels 227 and second channels 228 that are misaligned and are obstructed when the second membrane 220 is in the second position and free to enable passage of ions of the electrolyte 204 when the second membrane 220 is in the first position.

The structure of the separator affords numerous advantages for the supercapacitor described. In particular, the use of two perforated membranes that are impermeable when they are coupled together makes it possible to enable and disable in a controlled way supply of current by the supercapacitor. In this way, for example, it is possible to reduce in substantially, if not eliminate altogether, the discharge currents that normally flow through the electrolyte when known supercapacitors are not in use or are being recharged. The supercapacitor described is thus able to maintain the charge stored much longer than conventional supercapacitors. Further, it is possible to implement protection systems that rapidly interrupt current supply in the event of anomalous operating conditions (for example, in the presence of excessively high temperatures). In known supercapacitors, rises in temperature tend to limit the current as a result of thermal expansion of the porous separator, which reduces the section of passage of the pores and increases the equivalent series resistance. In the short term, the rise in temperature may effectively be in part contained thanks to the current limitation. However, the mechanical stresses caused by thermal expansion are hazardous both for the hermetic seal of the package and for the structural integrity of the separator. The negative effects of thermal stresses arise certainly with passage of time, causing early ageing of the component, but may also result in sudden failure of a new component. The separator described may, instead, be controlled to interrupt passage of current as soon as there arises a potentially dangerous condition, thus preventing damage due to mechanical stresses.

One of the advantages of the solution described derives from the fact that the separator may be integrated in a semiconductor substrate and obtained using standard technologies of semiconductors or microelectromechanical systems, which enable suspended membranes to be obtained with thicknesses much smaller than those that may be obtained with the techniques traditionally used in the manufacture of supercapacitors (for example, the roll-to-roll technique). Thanks to the reduced thickness, the separator has a very low equivalent series resistance in the active state, i.e., with the membranes separate from one another. Nevertheless, the equivalent series resistance is extremely high when the membranes are coupled, substantially preventing passage of current.

Further, the manufacturing techniques available for producing the supercapacitor described enable control with an extremely high precision of the dimensions of the cavities on the sides of the separator, the thickness of the membranes and their full/void ratio (dimensions and density of the through channels). Both the capacitance and the equivalent series resistance may thus be controlled with the same precision for each individual device. It is thus possible to provide composite supercapacitors (obtained by connecting elementary supercapacitors) without any need for resistive balancing networks, which are instead required with conventional supercapacitors. For the latter, in fact, the capacitance is not controllable with sufficient precision and the process spread calls for the need to associate resistive balancing networks to the composite supercapacitors.

Another advantage derives from the fact that in the semiconductor substrate it is possible to integrate other devices, such as a driving device, a charging device, an electrical load, or other auxiliary devices, such as a sensor temperature for detecting the temperature of the electrolyte in the chamber in order to provide a protection.

Figure 8:
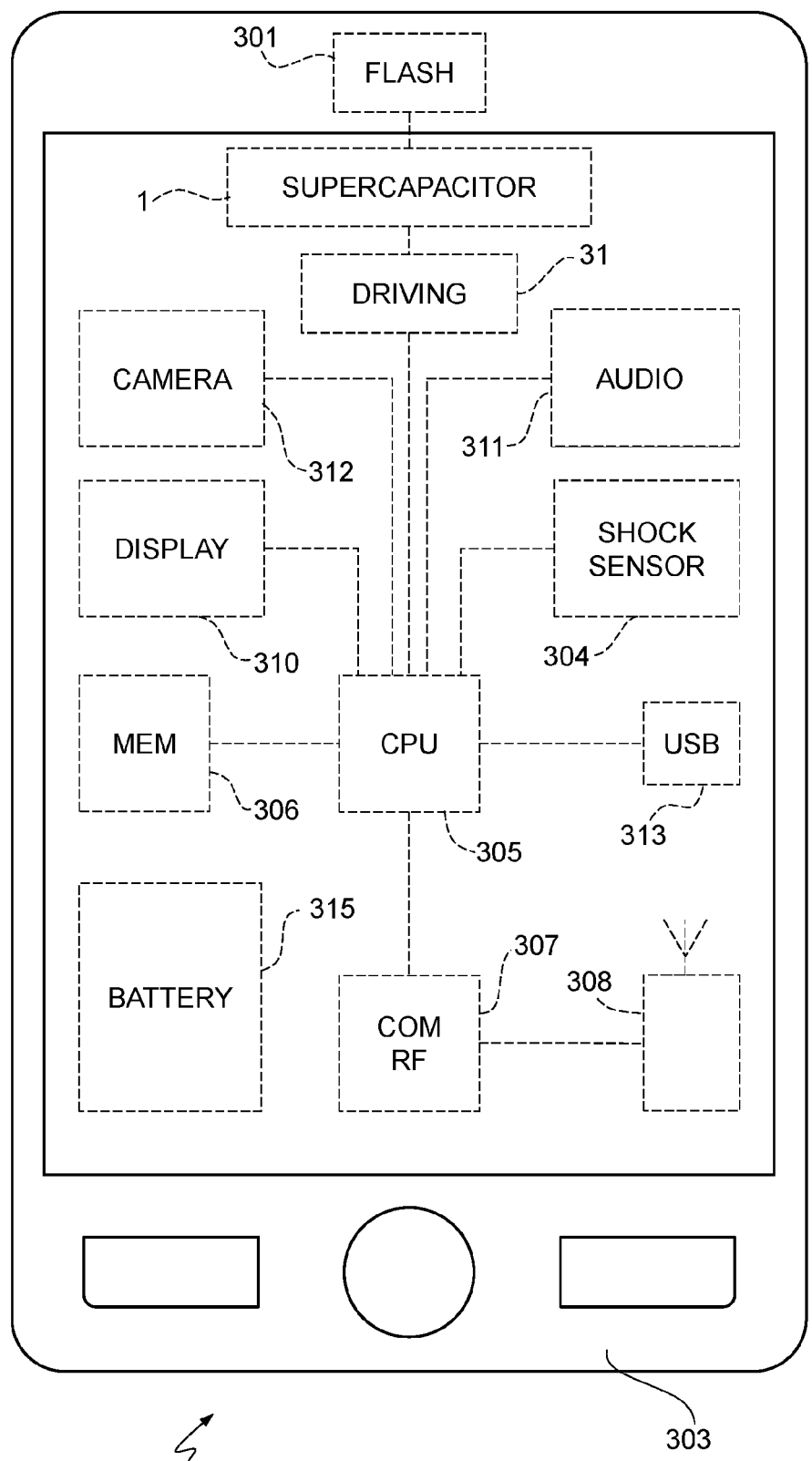
FIG. 8 shows a simplified block diagram of an electronic device that incorporates the supercapacitor of FIG. 1.

FIG. 8 illustrates an electronic system 300 that incorporates the supercapacitor 1 described.

The electronic system 300 may be an electronic device of any type, in particular a portable device supplied autonomously, such as, by way of non-limiting example, a cellphone, a portable computer, a video camera, a photographic camera, a multimedia reader, a portable apparatus for videogames, an motion-activated user interface for computers or consoles for videogames, a satellite navigation device, etc. In the embodiment of FIG. 8, the electronic system 300 is a cellphone and is provided with a flash 301 supplied by the supercapacitor 1.

The electronic system 300 may further comprise a shell 303, rigidly coupled to which is an impact sensor 304, a control unit 305, a memory module 306, an RF communication module 307 coupled to an antenna 308, a display 310, an audio module 311, an image-acquisition device 312, a serial connection port 313, for example a USB port and a battery 315 for autonomous supply.

The control unit 305 co-operates with the driving device 30 of the supercapacitor 1 for synchronizing activation of the flash 301 and of the image-acquisition device 312.

With reference to FIGS. 9-11, a supercapacitor according to one embodiment of the present invention is designated by number 401 and is represented in a triaxial system X, Y, Z. The supercapacitor 401 of FIG. 9 is a cross-sectional view of the supercapacitor 401 of FIG. 10, taken along the line of section I-I of FIG. 10. Further, the supercapacitor 401 of FIGS. 9 and 10 is represented in an intermediate step of the manufacturing process, i.e., immediately prior to the steps of introduction of an electrolytic solution and of packaging.

The supercapacitor 401 comprises a shell 402, an inner chamber 403, which is enveloped by the shell 402 and is designed to contain the electrolytic solution, a first electrode 405, a second electrode 406, and a separator 407. The first and second electrodes 405, 406 are arranged at respective ends of the chamber 403, i.e., ones facing opposite sides of the separator 407.

In one embodiment, the shell 402 comprises a frame-like structure 410, which includes (integrates) the separator 407, and extends between a base 411 and a lid 412.

The frame 410, the base 411, and the lid 412 define inner walls of the chamber 403. More in particular, the chamber 403 is internally divided into an upper chamber 403a, delimited by the frame 410, the lid 412, and the separator 407, and a lower chamber 403b, delimited by the frame 410, the separator 407, and the base 411.

Between the upper and lower chambers 403a, 403b there occurs a passage of ions through the separator 407, but not a passage of electrolytic liquid in so far as the holes of the separator 407 have dimensions (of the order of nanometers) such as to prevent passage of a fluid having a surface tension close to that of water. In this way, proper operation of the supercapacitor is guaranteed, thanks to the transfer of electric charges between the electrodes biased at voltages of opposite sign.

In one embodiment, the base 411, lid 412, and frame 10 are of semiconductor material and are obtained using known micromachining techniques. In particular, the base 411, frame-like structure 410, and lid 412 are provided in wafers distinct from one another, coupled by adhesive regions or by gluing or other wafer-to-wafer bonding techniques available in the state of the art. A wafer stack 413 is thus formed.

In the lid 412 and in the base 411, through holes 424 and 425 are provided, visible in FIGS. 10 and 11, to enable independent filling of the two, upper and lower, chambers 403a, 403b.

According to a different embodiment, a first portion of the frame 410 is provided, fixed with respect to the base 411, and a second portion of the frame 410 is provided, fixed with respect to the lid 412, in a premoulded package structure.

The chamber 403 is closed and sealed, on opposite sides, by the base 411 and by the lid 412 and, in use, is filled with the electrolyte. The first electrode 405 and the second electrode 406 are arranged, respectively, on the base 411 and on the lid 412 and both face the inside of the chamber 403, in contact with the electrolyte.

In a different embodiment, both the base 411 and the lid 412 may be defined by ceramic substrates or substrates of a composite material formed by a fabric of glass fibres in a matrix of epoxy resin, for example FR4. The electrodes 405, 406 may be obtained according to any known technique aimed at increasing the contact surface per unit area between the electrodes 405, 406 and the electrolyte.

The separator 407 is connected to the frame-like structure 410 and extends through the chamber 403 substantially parallel to the plane XY, i.e., parallel to the base 411 and to the lid 412. The chamber 403 is thus divided into two parts, one defined between the separator 407 and the base 411, where the first electrode 405 is located, and one between the separator 407 and the lid 412, where the second electrode 406 is located. Both parts of the chamber 403 are filled with the electrolyte.

The separator 407 is of a membrane type (with ionic membrane), for example of semiconductor material, and may be coated with a protective layer to prevent direct contact with the electrolyte, which is potentially harmful.

The separator 407 may be obtained in a silicon wafer that integrates a silicone nanomembrane, of $S_2N_4$ and having a thickness of 3-5 nm, with evident advantages in terms of reduction of the variety of the materials used and with consequent increased uniformity of the thermo-mechanical stresses transmitted.

On the frame 410, extending at peripheral portions thereof are electrical contact pads 419a, 419b. A metal through via 418 extends in depth in the frame 410 in the region of the pad 419a and electrically connects the pad 419a to the first electrode 405. In this way, the first electrode 405 is electrically accessible, since it contacts the pad 419a.

The metal through via 418 may be replaced (in a way not shown in the figures) by an inclined region obtained by patterning and metallizing selective portions of the frame 410 for forming a metallized connection surface between the pad 419a and the electrode 405.

The pad 419b is, instead, in electrical contact with the second electrode 406. For this purpose, the lid 412 has a metal path 406' that extends as prolongation of the second electrode 406 until it contacts the pad 419b. In this way, the second electrode 406 is electrically accessible, since it contacts the pad 419b.

Since the pad 419b and the metal path 406' are provided in different wafers, coupled together, the electrical contact between them (normally obtained via thermocompression of metallized surfaces) may be favored by coupling the respective wafers with conductive glue, or else with an adhesive conductive tape, or any other available methodology.

FIG. 10 illustrates the supercapacitor 401 in top perspective view. With reference to this figure, it may be noted that the lid 412 houses two external contacts 420a, 420b, designed to be biased at respective operating voltages and configured to be electrically coupled to the first and second electrodes 405, 406 for biasing also the latter at the respective operating voltages. For this purpose, metal wires 421a, 421b extend between a respective external contact 420a, 420b and a respective pad 419a, 419b.

It is evident that further and different embodiments for the formation of the electrical contacts with the first and second electrodes 405, 406 may be implemented, without thereby departing from the scope of the present disclosure.

The lid 412 also has, in this process step, the through hole 424 through which the separator 407 is exposed and which forms a top fluidic access to the chamber 403.

FIG. 11 illustrates the opposite side of the supercapacitor 401, i.e., the side of the base 411. In this case, the through hole 425 is present, through which the separator 407 is exposed and which forms a bottom fluidic access to the chamber 403.

There now follows a description, with reference to FIGS. 12-21, of a process of packaging and filling the supercapacitor 401 of FIGS. 9-12 with an electrolytic solution.

In what follows, reference will be made to a packaging process that may be applied at a wafer level. There will consequently be considered a wafer (or, rather, the wafer stack 413) that integrates a plurality of supercapacitors 401 of the type described previously, prior to the step of dicing and singulation. It is, however, evident that what is described in what follows may be adapted, in a way that will be evident in a per se known manner, to packaging of a single supercapacitor 401.

With reference to FIG. 12 (which, for simplicity of graphic representation, once again shows a single supercapacitor 401) a step of moulding of protective plastic material on the wafer stack 413 is carried out on the exposed surface of the lid 412, in particular in order to englobe and protect the metal wires 421a, 421b. There is formed for this purpose a first covering layer 428, which extends on the lid 412 for covering the metal wires 421a, 421b but not the through hole 424. For this purpose, the first covering layer 428 may surround completely the through hole 424, or else extend only partially around it.

A portion of the external contacts 420a, 420b remains exposed in order to enable, during use, coupling thereof with the voltage generators external to the supercapacitor 401, for biasing the electrodes 405 and 406, as has been said previously.

Moulding of the protective plastic material is optionally carried out further on the opposite side of the supercapacitor 401, i.e., at the base 411. In this case, a second covering layer 429 is formed, which extends on the base 411 for surrounding the through hole 425 completely or partially in order not to obstruct it.

The step of formation of the first and second covering layers 428, 429 occurs by known assisted-molding techniques known as "film-assisted molding", by molding a plastic material such as an epoxy resin added with silicon fillers in order to enhance the mechanical characteristics. This step is carried out at a temperature comprised between 150° C. and 175° C. and an injection pressure up to a maximum of 10 bar. The presence of an anti-adherent polytetrafluoroethylene (PTFE) film on the ceiling of the molding cavity enables shielding of component portions, which are thus not englobed by the resin.

There then follows a step of filling of the chamber 403 of the supercapacitor 401 with a liquid solution containing an electrolyte (in what follows, electrolytic solution).

For this purpose, it is possible to proceed according to two different operating modes, one illustrated with reference to FIGS. 13A-21 and the other with reference to FIGS. 22-28.

Figure 13B:
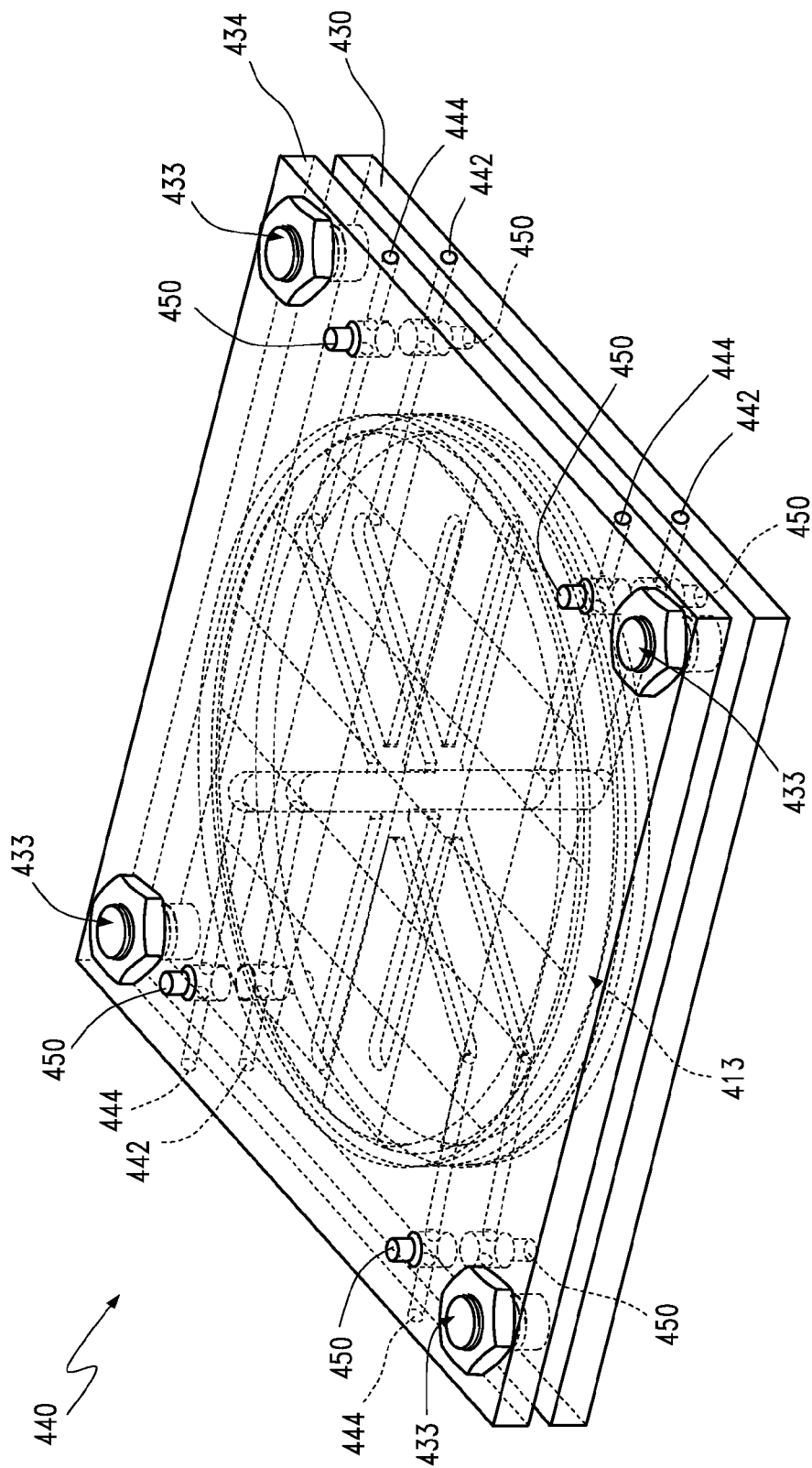

With reference to the first operative mode, FIG. 13A shows an assembly 440 in exploded perspective view, and FIG. 13B shows the assembly 440 once mounted.

The assembly 440 is formed by the wafer stack 413, by a bottom supporting base 430, for example of steel, by a top supporting base 434, for example of steel, and by fixing means (e.g., screws and bolts) designated as a whole by the reference number 433.

With reference to FIG. 13A, the bottom supporting base 430 has a circular trench 431 that provides a housing for an O-ring 432, i.e., a ring of elastomeric material, in particular with circular section, which functions as mechanical seal. The O-ring 432 is designed to be inserted into the aforementioned trench 431 of the bottom supporting base 430 and being compressed during assembly by a top supporting base 434, thus creating a bottom hermetic seal.

In a way not shown in detail in the figure, also the top supporting base 434 has a circular trench that provides a housing for a further O-ring 436, i.e., a ring of elastomeric material, in particular with circular cross-section, designed to be inserted into the aforementioned trench of the top supporting base 434 and being compressed during assembly by the bottom supporting base 430, thus creating a top hermetic seal.

The bottom supporting base 430 and top supporting base 434 are configured so that the wafer stack 413 may be housed in the region defined by the O-rings 432, 436 so that peripheral portions of the wafer stack 413 are in direct contact with the O-rings 432, 436.

The bottom supporting base 430 further has channels 438, which extend as trenches inside the region delimited by the O-ring 432. The channels 438 extend following a pattern such that they are in fluidic connection with each through hole 424 of each supercapacitor 401 integrated in the wafer stack 413. It is evident that the channels 438 may be replaced by a single opening of a basin-shaped type configured so that each through hole 424 is in fluidic contact with said basin-shaped opening.

The bottom supporting base 430 further has one or more inlet-outlet holes 442, provided on one or more side surfaces of the bottom supporting base 430 and fluidically coupled to the channels 438 by fluidic paths 441 buried within the bottom supporting base 430.

Also the top supporting base 434 further has channels 448 that extend as trenches inside the region delimited by the O-ring 436. Also in this case, the channels 448 extend following a pattern such that they are in fluidic contact with each through hole 425 of each supercapacitor 401 integrated in the wafer stack 413. It is evident that also in this case said channels 448 may be replaced by a single opening of a basin-shaped type configured so that each through hole 425 is in fluidic contact with said basin-shaped opening. The top supporting base 434 further has one or more inlet-outlet holes 444, which are provided on one or more side surfaces of the top supporting base 434 and are fluidically connected with the channels 448 by fluidic paths 443 buried within the top supporting base 434.

FIG. 14 is a view in lateral section of the assembly 440 of FIG. 13B. With reference to FIGS. 13B and 14, when the assembly 440 is mounted, the wafer stack 413 is arranged between the bottom supporting base 430 and the top supporting base 434, and more in particular between the O-ring 432 and the O-ring 436, and the through holes 424, 425 are in fluidic connection with the outside of the assembly 40 through respective fluidic paths 441, 443 accessible via the inlet-outlet holes 442, 444.

As may be noted more clearly from FIG. 14, a system of valves 450 is further present, which are operatively coupled to each fluidic path 441, 443 and are designed to be activated for interrupting the respective fluidic path 441, 443, thus fluidically isolating the outside of the assembly 440 and the channels 438, 448. The valves 450 are, for example, obtained with mechanical systems (e.g., screws), which may be governed at a distance via a system of articulated joints and mechanical transmissions or else solenoid valves of a known type, which may be electrically controlled at a distance via wired connection or else by a timed system (provided with a timer and a battery) integrated on the support itself. The valves 450 are configured to function alternatively in a first operating condition in which they interrupt the respective fluidic path 441, 443, and in a second operating condition in which they enable the respective fluidic path 441, 443, connecting the inlet-outlet holes 442, 444 with the respective channels 438, 448.

With reference to FIG. 15, a vacuum pressure is generated with a value, for example, lower than 1 mbar, inside the assembly 440, i.e., in the channels 438, 448 and inside the chamber 403 of each supercapacitor 401 provided in the wafer stack 413 (which, as has been said, is in fluidic connection with the channels 438, 448). For this purpose, it is possible to provide the assembly 440 in a reactor for micromachining processes, making sure that the valves 450 are in an open position (second operating condition mentioned above), and generating the desired vacuum level (with a value, for example, lower than 1 mbar).

Alternatively, it is possible to connect the inlet-outlet holes 442, 444 to a vacuum pump, and activate it to obtain the desired value of vacuum pressure.

In both of the embodiments, the pressure inside the assembly 440 drops, as indicated by the arrows 452.

With reference to FIG. 16, once the desired vacuum pressure has been reached, the valves 450 are closed (first operating condition mentioned above), and the assembly 440 is removed from the reactor/disconnected from the vacuum pump.

The valves 450, as has been said previously, are provided, for example, by mechanical systems (e.g., screws), which may be governed remotely via a system of articulated joints and mechanical transmissions or else solenoid valves which may be controlled electrically at a distance via wired connection or else by a timed system (timer and battery) integrated on the same support as the one that houses the assembly 440, for example when the assembly 440 is arranged in the reactor. Then, the assembly 440, in the operating condition of FIG. 16, i.e., with valves 450 closed, is immersed in a tank 454, which is filled with electrolytic solution 456, for example NaCl.

With reference to FIG. 18, the valves 450 are opened (as indicated by the arrows 458), and the electrolytic solution 456 flows (as indicated by the arrows 459) towards the channels 438, 448 through the buried paths 441 and 443 and, through the through holes 424, 425, fills the chambers 403 of each supercapacitor 401. The flow of electrolytic solution 456 towards the chambers 403 of the supercapacitors 401 is sustained by the pressure difference existing between the inside of the assembly 440 (vacuum pressure or low pressure) and the external environment (higher pressure), and lasts until the pressure inside and outside the assembly 440 balance one another.

Then, the valves 450 are closed again (first operating condition mentioned above), and the electrolytic solution 456 is removed from the tank 454, thus causing the level to drop. Since the part of molded plastic is open on its edges, the liquid previously trapped may freely flow from the top surface of the wafer stack 413. The top supporting base 434 may then be removed, keeping the wafer stack 413 in a horizontal position, i.e., in the plane XY, or in any case in a position such as to prevent accidental and undesirable exit of the electrolytic solution present within the chambers 403 of the supercapacitors 401.

Then a step of dispensing of an epoxy resin 457 is carried out using a purposely provided dispenser 461 (of a per se known type), in order to clog selectively the through holes 424 of each supercapacitor 401. The epoxy resin used is, for example, of a type that may be cured with ultraviolet light and/or thermally (examples of resins that may be used include: isobornyl acrylate/urethaneacrylate oligomers, or else isobornyl acrylate/-vinyl-2-pyrrolidone.

In this case, a step of exposure to UV radiation enables solidification of the epoxy resin. If the step of solidification of the epoxy resin requires a treatment at high temperature, it is advisable to use resins of a type such that the temperature of treatment is lower than the boiling point of the electrolytic solution. For example, an epoxy resin is used (e.g., with a base of isobornyl acrylate/urethaneacrylate oligomers, or else isobornyl acrylate/-vinyl-2-pyrrolidone), which is cured by a UV curing step at a temperature of approximately 50° C.

As an alternative to the epoxy resin 457 and to other irreversible materials, the solidification of which occurs at a temperature lower than the boiling point of the electrolyte, or else the solidification temperature of which is lower than 100° C., it is possible to use a paraffin wax or a similar reversible material, namely, one that is able to melt in the case where the temperature is close to the boiling point of the electrolyte. Said reversible material thus acts as "safety valve" enabling discharge of the electrolyte in air without any risk of explosion of the supercapacitor due to the overpressure that would be generated in the case where the electrolyte were to boil.

Operations similar to the ones described with reference to FIG. 19 are carried out in order to remove the bottom supporting base 430 and clog the through holes 425. For this purpose, the assembly 440 (which is now without the top supporting base 434 and with the through hole 424 clogged) is turned through 180° and arranged with the bottom supporting base 430 facing upwards. The bottom supporting base 430 is then removed, and the electrolytic solution 456 is removed from the tank 454 by causing it to flow away. Since the part of moulded plastic is open on its edges, the liquid previously trapped may freely flow from the top surface of the wafer stack 413.

Also in this case, the wafer stack 413 is held in a horizontal position, i.e., in the plane XY, or in any case in a position such as to prevent any accidental and undesirable exit of the electrolytic solution present within the chambers 403 of the supercapacitors 401 through the respective through holes 425.

Then, a step of dispensing of the epoxy resin is carried out in order to clog the through holes 425 of each supercapacitor 401, followed by a UV curing step, similar to the one described previously.

Figure 21:
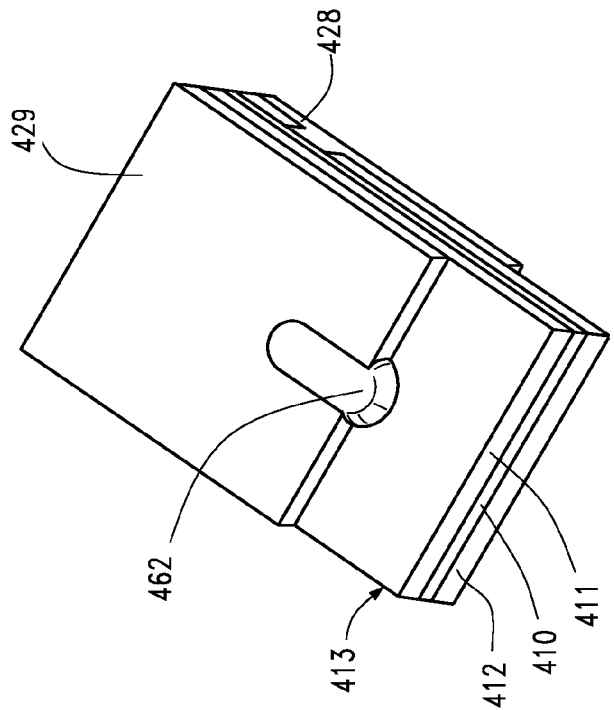
Figure 20:
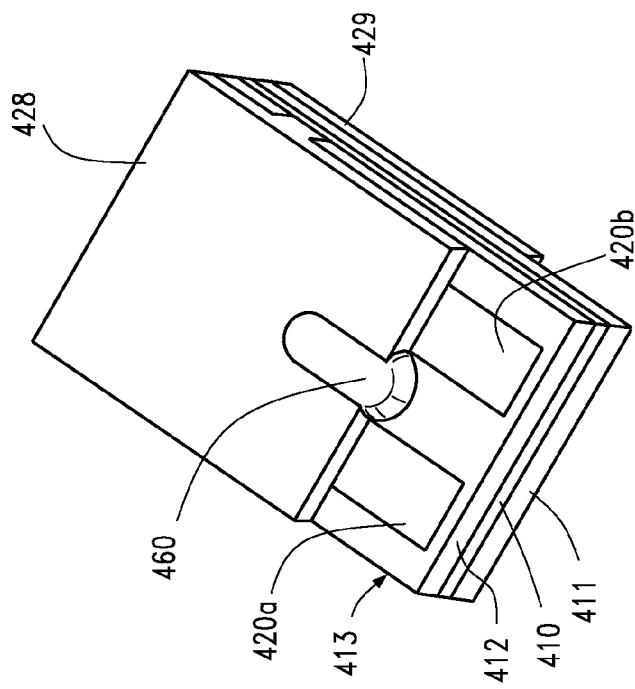

Then a step of dicing of the wafer stack 413 is carried out to isolate each supercapacitor 401, thus obtaining a plurality of supercapacitors 401 of the type shown in FIGS. 20 and 21.

FIGS. 20 and 21 show by way of example (in the views of FIGS. 10 and 11, respectively) a single supercapacitor 401 in which the through holes 424 and 425 have been sealed with the epoxy resin, thus forming respective first and second plugs 460, 462, after the steps described with reference to FIGS. 13A-19.

FIGS. 22-28 illustrate a process of packaging and filling of the supercapacitors 401 of the wafer stack 413 according to an embodiment alternative to that of FIGS. 13A-20.

For this purpose, the wafer stack 413 is inserted into a tank 469 that has an inlet opening 469a through which the wafer stack 413 may be inserted sideways on. In the same triaxial reference system as the one introduced in FIG. 9, the wafer stack 413 is inserted in the direction X.

The tank 469 has an automated pneumatic system 470, which includes a first piston 475 and a second piston 476, which are designed to carry a first supporting base 472 and a second supporting base 474 of a type similar to the top and bottom supporting bases 430, 434 described previously. The first piston 475 is coupled to the first supporting base 472, and the second piston 476 is coupled to the second supporting base 474.

A first winding 480 extends around a first portion of the tank 469, close to the opening 469a for insertion of the wafer stack 413, completely surrounding said first portion of the tank 469. A second winding 482 extends underneath the first winding 480 around a second portion of the tank 469. The second portion of the tank 469, thus, extends at a greater distance from the opening 469a as compared to the first portion of the tank 469. The second winding 482 completely surrounds the second portion of the tank 469.

The first winding 480 is configured to heat the first portion of the tank 469. For example, the first winding 480 is formed by a pipe passing through which is heating liquid; alternatively, it is an electric wire resistor that generates heat by the Joule effect. The second winding 482 is configured to maintain the second portion of the tank 469 at a temperature lower than that of the first portion of the tank 469. For example, it is obtained by a pipe passing through which is cooling liquid.

According to one embodiment, the first winding 480 generates, in the first portion of the tank 469, a temperature comprised between 120° C. and 100° C., whereas the second winding 482 generates, in the second portion of the tank 469, a temperature comprised between 20° C. and 10° C. The tank 469 is of thermally conductive material, for example copper or aluminum, so that the temperature generated by the first and second windings 480, 482 outside the tank 469 is transferred in respective internal regions of the tank 469.

According to one embodiment, the first portion of the tank 469 extends along X, starting from the opening 469a, for a length $d_1$ of, for example, 0.2 m, whereas the second portion of the tank 469 extends underneath (or immediately underneath) the first portion, for a length $d_2$ measured along X of, for example, 0.5 m.

A gripper 477, provided with a stem 477' coupled to a motor (e.g., a stepper motor, not shown), enables the wafer stack 413 to be moved in the direction X, i.e., in order to insert and remove the wafer stack into and from the tank 469. The stepper motor is thus configured to enable a precise movement of the gripper 477 in the direction X.

The wafer stack 413, introduced into the tank 469 by the gripper 477, is arranged parallel to, and between, the first and second supporting bases 472, 474. As may be noted from FIG. 22, the first and second supporting bases 472, 74 are provided with a respective recess 472', 474', which defines a chamber for housing the wafer stack 413. Each recess 472', 474' is surrounded by a respective O-ring 478, 479, having the function of providing a hermetic seal, similar to the one described previously with reference to the O-rings 432 and 436.

Figure 23:
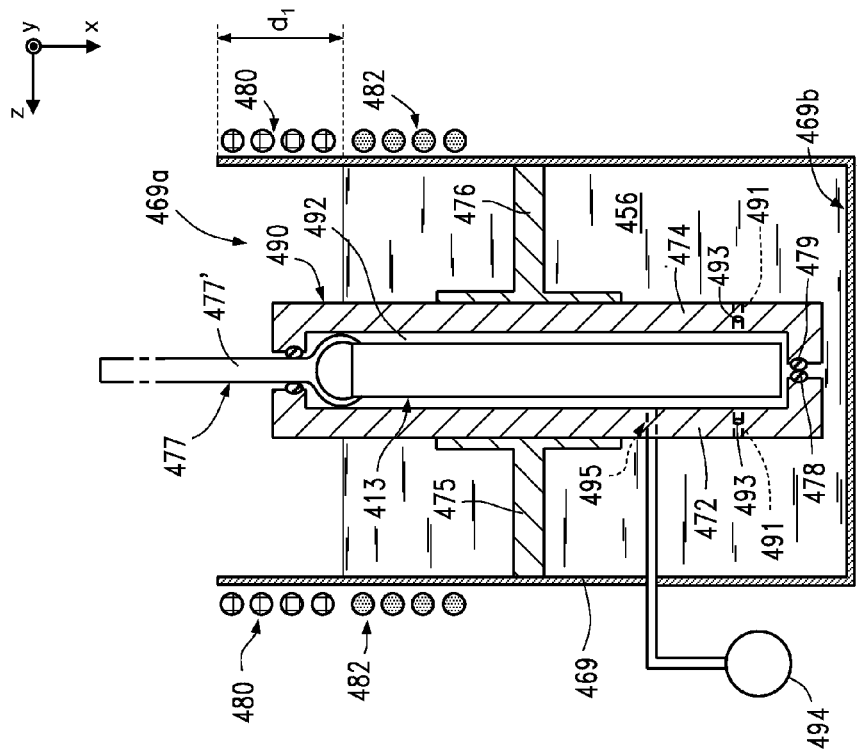
Figure 22:
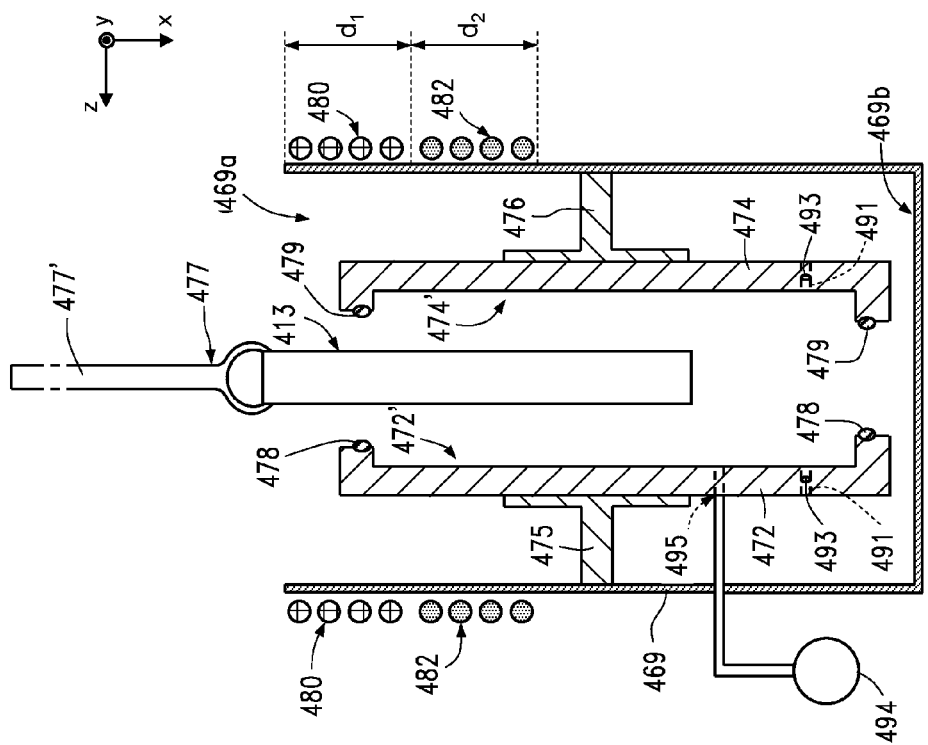
Figure 24:
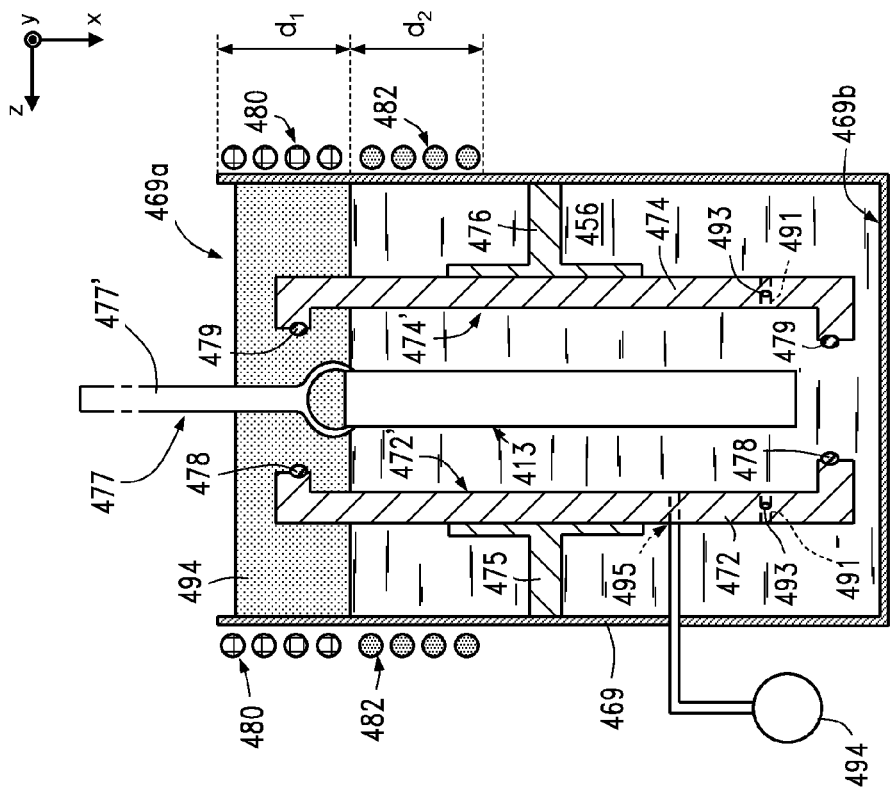
Figure 25:
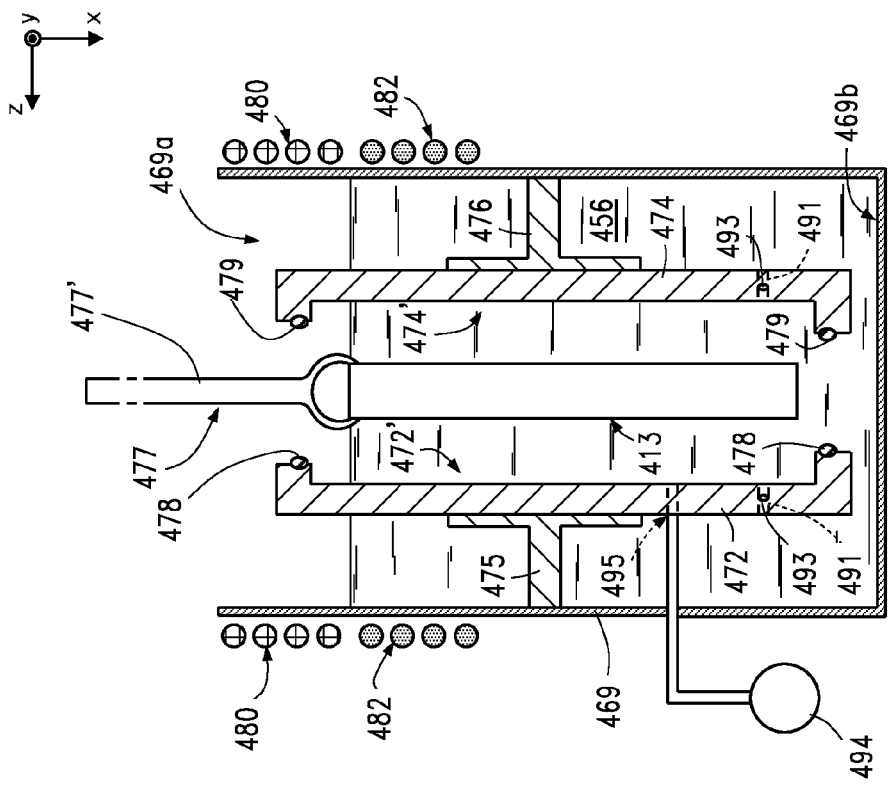

In use, as shown in FIG. 23, the first and second pistons 475, 476 are actuated (e.g., by a stepper motor, of a per se known type) for bringing the first and second supporting bases 472, 474 into mutual contact. An assembly 490 is thus formed, which defines an inner chamber 492 housed in which is the wafer stack 413 and, in part, the stem 477' of the gripper 477.

The O-rings 478, 479 are in contact with one another except for a region thereof that extends in a position corresponding to the stem 477' of the gripper 477. In said region, the O-rings 478, 479 are in contact with the stem 477' of the gripper 477. To optimize hermetic tightness of the assembly 490, the first and second supporting bases 472, 474 may be modelled to be thinner in said region in order to follow the shape of the stem of the gripper 477.

In particular, it is here pointed out that the first and second supporting bases 472, 474 are provided, in a way similar to what is described with reference to the top and bottom supporting bases 430, 434, with channels 491 for access to the inner chamber 492, which are operatively coupled to respective valves (e.g., solenoid valves) 493.

The valves 493 may be selectively governed in an open state for enabling fluidic connection between the inner chamber 492 and the environment external to the assembly 490, and in a closed state for inhibiting fluidic connection between the inner chamber 492 and the environment external to the assembly 490.

Preferably, the channels 491 are provided in portions of the first and second supporting bases 472, 474 close to a bottom surface 469b of the tank 469.

Further, at least one of the first and second supporting bases 472, 474 is provided with an inlet 495 for a vacuum pump 494, designed to be actuated for generating a vacuum pressure inside the chamber 492 and, consequently, inside each chamber 403 of the supercapacitors 401 of the wafer stack 413.

Then, the vacuum pump 494 is activated to reduce the pressure inside the chamber 492, in particular to bring it to a value lower than 1 mbar.

Keeping the valves 493 closed (the inner chamber 492 is fluidically isolated from the outside of the assembly 490), the tank 469 is filled through the opening 469a with an electrolytic solution, in particular of the same type as the electrolytic solution 456, and thus here designated by the same reference number. In particular, the tank 469 is filled as far as the maximum height (in the direction X) corresponding to the winding 482, but in any case below the height at which the winding 480 is located. In other words, the electrolytic solution 456 reaches a distance, measured starting from the opening 469a, equal to, or greater than, $d_1$.

Next, the valves 493 are driven into the open state so that the electrolytic solution 456 may flow into the chamber 492 through the channels 491. Said flow is sustained by the pressure difference existing between the inner chamber 492 of the assembly 490 (vacuum pressure or low pressure) and the external environment (higher pressure), and lasts until the pressure inside and outside the assembly 490 balance one another.

Then, the wafer stack 413 is released from the first and second supporting bases 472, 474 by actuating the pistons 475, 476.

Next, a step of pouring of a wax 494 in the liquid state is carried out. The wax used preferably has good characteristics of electrical insulation. Further, the wax used has, at a temperature higher than the melting point, typically 90° C., a molecular weight lower than that of the electrolytic solution 456 so that it floats on the electrolytic solution 456. For example, a paraffin wax, with polyethylene base, having a molecular weight of 600, a viscosity of 10 CPS (in a temperature range of 99-149° C.), and a melting point of 94° C. may be used. Other characteristics of the wax 494 include non-solubility in water.

In order to keep the wax 494 in the liquid form, the winding 480 is activated and controlled for generating a temperature such as to keep the wax 494 in the liquid state (for instance, in this specific example, equal to or higher than 94° C.). In this case, it is expedient to keep the electrolytic solution 456 underneath the wax 494 at a temperature lower than that of the wax in order to prevent phenomena of boiling of the electrolytic solution 456. For this purpose, also the winding 482 is activated in order to cool the portion of electrolytic solution 456 beneath the wax 494. For example, the winding 482 is configured to keep the electrolytic solution 456 at a temperature lower than 90° C.

Then, the wafer stack 413 is removed from the tank 469 (as indicated by the arrow 496), by moving the hook 477 along X in the direction identified by the arrow 496.

During the step of removal of the wafer stack 413, the wax 494, which floats on the electrolytic solution 456, deposits and adheres to the wafer stack 413, and, as it cools, forms a film of wax 500 that evenly coats the entire wafer stack 413. The film of wax 500 also seals the through holes 424 and 425 of each supercapacitor 401 integrated in the wafer stack 413.

Then, a step of selective removal of the film of wax 500 from the wafer stack 413 is carried out in order to remove the film of wax 500 from the regions corresponding to the external contacts 420a, 420b of each supercapacitor 401, but not from the through holes 424, 425. Possibly, the film of wax 500 may be removed also from other regions of the supercapacitors 401, in any case preserving the plugs of wax that close the through holes 424 and 425.

In order to remove selectively the film of wax 500 a purposely provided solvent is used, designed to remove the wax 494 used. For example, methyl esters of vegetable oils are used.

The step of selective removal of the film of wax 500 is described with reference to FIGS. 27. With reference to this figure, the wafer stack 413 is arranged between a first plate 502 and a second plate 504, for example plates of steel. The first and second plates 502, 504 are in direct contact with the portions of film of wax 500 that extend over the first covering layer 428 and second covering layer 429, respectively, of each supercapacitor 401 belonging to the wafer stack 413. Since the region that has the contacts 420a, 420b extends to a height lower than that to which the first and second covering layers 428, 429 extend, said region is not in direct contact with the first plate 502 (this detail is not visible in the overall view of FIG. 27).

The first plate 502 and, optionally, the second plate 504, function as coolers for cooling the portion of the film of wax 500 with which they are in direct contact, but not the remaining portions of the film of wax 500. In order to improve cooling of said portions of the film of wax 500, the exposed surface of the first plate 502 is cooled. The heat may be removed by a flow of water or other cooling liquid, for maintaining the surface of the plate 502, which is in contact with the paraffin, at a temperature lower than 50° C.

The solvent solution, heated to a temperature between 90° C. and 100° C. in order to melt the paraffin, is made to flow in order to increase the effectiveness of removal of the paraffin in the regions of the wafer stack 413 that are not in direct contact with the plate 502. Removal of the film of wax 500 is obtained by the joint action of the chemical formulation of the solvent and of the temperature of the solvent. It is thus evident that the regions of the film of wax 500 that are not removed are exclusively the cooled ones, i.e., the ones in direct contact with the plate 502.

Then, dicing and singulation of the wafer stack 413 is carried out in order to separate each supercapacitor 401.

FIG. 20 shows, in perspective view according to the representation already used for FIGS. 10 and 20, a single supercapacitor 401 provided with layers of wax 510, 512 that extend exclusively over the first and second covering layers 428, 429, clogging the holes 424 and 425 (i.e., in the portions on which the first plate 502 and the second plate 504 directly rested).

The process described, according to all the embodiments presented, affords numerous advantages.

In particular, it may be noted that the use of a plug of wax, or paraffin wax, or epoxy resin, or other sealant material as described previously, in particular having a melting point lower than, or comparable with, the boiling point of the electrolytic solution 456, improves safety of the supercapacitor 401. In fact, the use of a sealant material having said characteristics makes it possible to provide a safety valve that melts when the temperature of the electrolytic solution contained in the chamber 403 of the supercapacitor reaches boiling points (e.g., of approximately 100° C.), thus preventing phenomena of overpressure inside the supercapacitor 401 that might cause explosion thereof.

Further, the process is based upon silicon wafers, thus enabling a high yield.

The process is further flexible in terms of design and dimensions of the supercapacitor (it is possible to provide on a same wafer—a same wafer stack 413—supercapacitors having shapes and dimensions different from one another).

The process further enables use of electrolytes of a type chosen according to the need by simply replacing them in the tank used for filling the inner chamber 403 of the supercapacitors.

Finally, it is evident that modifications and variations may be made to the process described herein, without thereby departing from the scope of the present disclosure.

For example, it is possible to eliminate the contacts 420a, 420b provided on the lid 412, the wires 421a, 421b and the layers of plastic resin 428 and 429 formed. Biasing would be carried out, in this case, by positioning a connector with two contacts that penetrate through slits made in the lid 412 and in the frame-like structure 410, contacting the two contacts 419a and 419b. The through holes 424 would be closed by the layer of paraffin after filling of the chambers 3, according to the process described in FIGS. 22-28. In order to prevent the slits designed for passage of the contacts of the connector from being obstructed by the paraffin, instead of removing it, it would be possible to insert purposely provided plugs in the slits prior to the process of deposition of the paraffin. This variant would prove economically advantageous.

It should be noted that the scope of the present disclosure is not limited to embodiments that necessarily present specifically one of the devices listed or all of them together.

Finally, it is evident that modifications and variations may be made to the supercapacitor and the manufacturing method described, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A supercapacitor comprising:
   a shell;
   a chamber in the shell;
   a first electrode and a second electrode on respective walls of the chamber; and
   a separator arranged between the first electrode and the second electrode across the chamber, the separator including a perforated first membrane and a perforated second membrane which is movable with respect to the first membrane between a first position, in which the first membrane and the second membrane are separated from each other and a second position, in which the first membrane and the second membrane are in contact with each other and coupled so as to render the separator impermeable.

2. The supercapacitor according to claim 1, wherein the first membrane includes first through channels and the second membrane includes second through channels, which are misaligned with respect to the first through channels.

3. The supercapacitor according to claim 2, wherein the first through channels and the second through channels are arranged so that, when the second membrane is in the second position, the first through channels are obstructed by the second membrane and the second through channels are obstructed by the first membrane.

4. The supercapacitor according to claim 1, wherein the separator is impermeable when the second membrane is in the second position.

5. The supercapacitor according to claim 1, comprising a semiconductor substrate incorporated in the shell and defining a frame structure around a portion of the chamber, the first membrane being rigid and fixed to the semiconductor substrate.

6. The supercapacitor according to claim 5, wherein the second membrane is connected to the semiconductor substrate by elastic connection elements.

7. The supercapacitor according to claim 5, wherein the second membrane is elastically deformable and has a perimeter connected to the semiconductor substrate.

8. The supercapacitor according to claim 5, wherein the first membrane and the second membrane comprise semiconductor material.

9. The supercapacitor according to claim 5, wherein the first membrane and the second membrane are capacitively coupled to each other.

10. The supercapacitor according to claim 5, comprising an electrostatic actuator operable to determine a position of the second membrane with respect to the first membrane.

11. The supercapacitor according to claim 10, comprising a driving device integrated in the semiconductor substrate and configured to control the electrostatic actuator.

12. The supercapacitor according to claim 11, comprising a temperature sensor integrated in the semiconductor substrate and configured to supply a temperature signal indicating a temperature inside the chamber, the driving device being configured to supply a control signal to the electrostatic actuator as a function of the temperature signal.

13. The supercapacitor according to claim 5, wherein:
   the frame structure of the semiconductor substrate is an internal frame structure;
   the shell comprises a base, a lid and an external frame structure, which is arranged on the base and closed by the lid on a side opposite to the base;
   the first electrode is arranged on the base;
   the second electrode is arranged on the lid; and
   the semiconductor substrate is bonded to the base with the internal frame structure around the first electrode and is incorporated in the external frame structure.

14. The supercapacitor according to claim 5, wherein:
   the shell comprises a first closing substrate, a second closing substrate and a frame-like spacer structure;
   the semiconductor substrate is arranged between the first closing substrate and the second closing substrate and the frame-like spacer structure is arranged between the semiconductor substrate and the second closing substrate;
   the first electrode is arranged on the first closing substrate;
   the second electrode is arranged on the second closing substrate; and
   the semiconductor substrate is bonded to the first closing substrate with the frame structure around the first electrode.

15. The supercapacitor according to claim 1, comprising an electrolyte inside the chamber.

16. The supercapacitor according to claim 15, wherein the separator is permeable to the electrolyte when the first membrane and the second membrane are separated and impermeable to the electrolyte when the first membrane and the second membrane are in contact.

17. An electronic system comprising a control unit and a supercapacitor coupled to the control unit, the supercapacitor including:
   a shell;
   a chamber in the shell;
   a first electrode and a second electrode on respective walls of the chamber; and
   a separator arranged between the first electrode and the second electrode across the chamber, the separator including a perforated first membrane and a perforated second membrane which is movable with respect to the first membrane between a first position, in which the first membrane and the second membrane are separated from each other and a second position, in which the first membrane and the second membrane are in contact with each other and coupled so as to render the separator impermeable.

18. The electronic system according to claim 17, wherein:
   the first membrane includes first through channels and the second membrane includes second through channels, which are misaligned with respect to the first through channels; and
   the first through channels and the second through channels are arranged so that, when the second membrane is in the second position, the first through channels are obstructed by the second membrane and the second through channels are obstructed by the first membrane.

19. A supercapacitor comprising:
   a shell;
   a chamber in the shell;
   a first electrode and a second electrode in the chamber; and
   a separator arranged between the first electrode and the second electrode across the chamber, the separator including a first membrane and a second membrane which is movable with respect to the first membrane between a first position, in which the first membrane and the second membrane are separated from each other and the separator is permeable, and a second position, in which the first membrane and the second membrane are in contact with each other and the separator is impermeable.

20. The supercapacitor according to claim 19, wherein at least one of the first and second membranes includes through channels that are closed off when the second membrane is in the second position.

* * * * *